(12) United States Patent
Asai et al.

(10) Patent No.: US 8,096,286 B2
(45) Date of Patent: Jan. 17, 2012

(54) METHOD OF CONTROLLING INTERNAL COMBUSTION ENGINE

(75) Inventors: Gou Asai, Osaka (JP); Hitoshi Adachi, Osaka (JP); Isao Takagawa, Osaka (JP); Takashi Miyamoto, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 331 days.

(21) Appl. No.: 12/514,698

(22) PCT Filed: Sep. 21, 2007

(86) PCT No.: PCT/JP2007/068404
§ 371 (c)(1),
(2), (4) Date: May 13, 2009

(87) PCT Pub. No.: WO2008/059663
PCT Pub. Date: May 22, 2008

(65) Prior Publication Data
US 2010/0063710 A1    Mar. 11, 2010

(30) Foreign Application Priority Data

Nov. 16, 2006  (JP) ................................ 2006-310807
Nov. 16, 2006  (JP) ................................ 2006-310808
Nov. 16, 2006  (JP) ................................ 2006-310809

(51) Int. Cl.
*F02D 7/00*       (2006.01)
*F02D 13/06*      (2006.01)

(52) U.S. Cl. .................... 123/481; 123/198 F; 701/105; 701/113

(58) Field of Classification Search .................. 123/481, 123/198 F, 179.16, 179.17, 299–300, 305; 701/102, 103, 104, 105, 113
See application file for complete search history.

(56) References Cited

U.S. PATENT DOCUMENTS 5,868,116 A * 2/1999 Betts et al. ................... 123/481
(Continued)

FOREIGN PATENT DOCUMENTS
JP       040941/1975         4/1975
(Continued)

OTHER PUBLICATIONS

Supplemental Search Report for European Appl. No. 07807736, European Patent Office, mailed Nov. 17, 2009, 6 pgs.

(Continued)

*Primary Examiner* — Thomas Moulis
(74) *Attorney, Agent, or Firm* — Sterne, Kessler, Goldstein & Fox PLLC

(57) ABSTRACT

A method for controlling an internal combustion engine, in which a traveling with reduced cylinders is controlled according to the idle-speed after the engine starting, so as to restrain the discharge of white smokes at the time lag for temperature equilibration soon after a cold starting. The method comprises a coolant water temperature detecting means 10 for detecting the coolant water temperature in the internal combustion engine 1, a rotation speed detecting means 12 for detecting the rotation speed of the internal combustion engine 1 and a control means for controlling the operation of the internal combustion engine 1 in accordance with the coolant water temperature and the rotation speed. When the internal combustion engine is evaluated that it is at the cold starting and the rotation speed reaches the predetermined rotation speed after the engine starting, a traveling with reduces cylinders is performed, which reduces the number of cylinders injecting fuels for a certain period of time.

6 Claims, 26 Drawing Sheets

U.S. PATENT DOCUMENTS

| | | | |
|---|---|---|---|
| 5,890,467 A | 4/1999 | Romzek | |
| 5,930,992 A * | 8/1999 | Esch et al. | 60/274 |
| 6,009,857 A | 1/2000 | Hasler et al. | |
| 6,286,488 B1 * | 9/2001 | Wisinski | 123/481 |
| 6,520,158 B1 | 2/2003 | Mills | |
| 6,931,839 B2 * | 8/2005 | Foster | 60/284 |
| 6,978,204 B2 * | 12/2005 | Surnilla et al. | 701/103 |
| 7,069,718 B2 * | 7/2006 | Surnilla et al. | 60/284 |
| 7,086,386 B2 * | 8/2006 | Doering | 123/479 |
| 7,478,625 B1 * | 1/2009 | Gwidt et al. | 123/481 |
| 7,487,030 B2 * | 2/2009 | Heap et al. | 701/103 |
| 7,801,664 B2 * | 9/2010 | Winstead | 701/103 |
| 2002/0129789 A1 | 9/2002 | Furukawa et al. | |
| 2004/0177836 A1 | 9/2004 | Hasler et al. | |
| 2005/0193988 A1 * | 9/2005 | Bidner et al. | 123/481 |
| 2006/0218899 A1 * | 10/2006 | Narita et al. | 60/285 |
| 2007/0180817 A1 | 8/2007 | Yamashita et al. | |
| 2011/0088661 A1 * | 4/2011 | Sczomak et al. | 123/481 |

FOREIGN PATENT DOCUMENTS

| | | |
|---|---|---|
| JP | 1986-258950 | 11/1986 |
| JP | 63-106337 | 5/1988 |
| JP | 03-151529 | 6/1991 |
| JP | 04-232346 | 8/1992 |
| JP | 1995-35835 U | 7/1995 |
| JP | 07-279698 | 10/1995 |
| JP | 09-060541 | 3/1997 |
| JP | 09-264163 | 10/1997 |
| JP | 2001-041084 | 2/2001 |
| JP | 2002-339764 | 11/2002 |
| JP | 2004 353516 | 12/2004 |
| JP | 2005-069237 | 3/2005 |
| JP | 2006-183493 | 7/2006 |
| WO | WO 2005/124130 | 12/2005 |

OTHER PUBLICATIONS

International Search Report for International Application No. PCT/JP2007/068404, Japanese Patent Office, mailed Jan. 15, 2008, 4 pgs.

* cited by examiner

FIG. 13
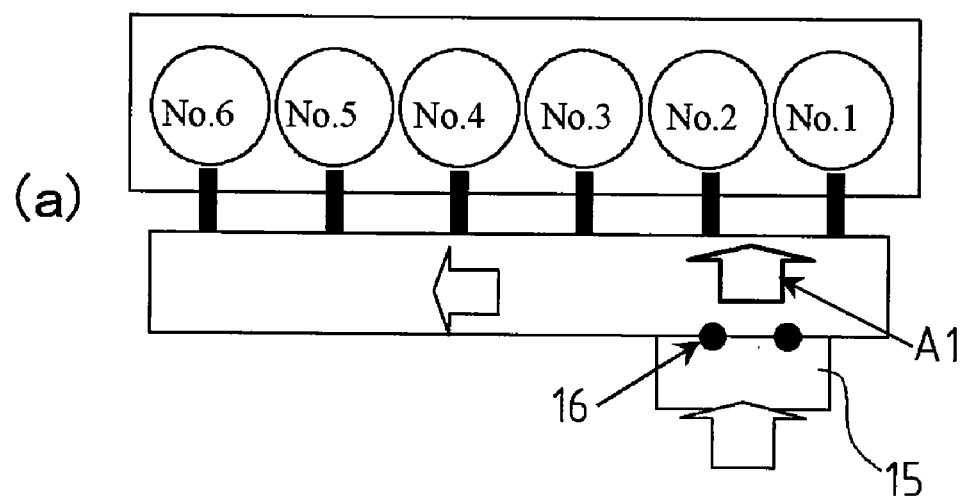
(a)
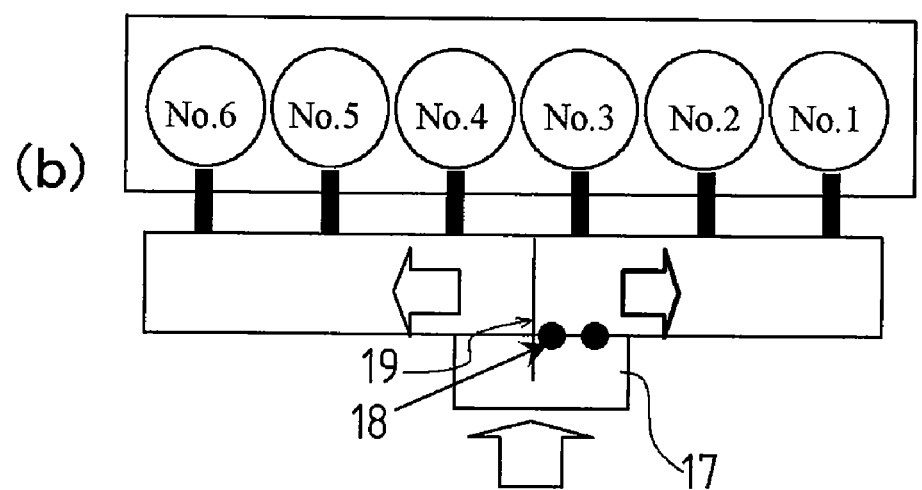
(b)

METHOD OF CONTROLLING INTERNAL COMBUSTION ENGINE

BACKGROUND OF THE INVENTION

1. Field of the Invention

The present invention relates to a method for controlling an internal combustion engine which can reduce white smoke emissions at the time of starting an engine on a cold condition, i.e., immediately after a cold start.

2. Related Art

Conventionally, when starting at cold temperature in a direct fuel-injection diesel engine or the like, white smokes with pungent odors are discharged. As a countermeasure against this, there is well-known a technology for reducing white smoke by reducing the number of cylinders performing fuel injections when starting the engine and by increasing fuel injection quantities in the cylinders injecting fuels so as to increase a combustion temperature in a combustion chamber, i.e., a technology called traveling with reduced cylinders, (see for example, JP1986-258950 and JP1995-35835).

For example, the wall temperature in the combustion chamber is strongly involved in a tendency of discharging the white smoke from the direct fuel-injection diesel engine, as a cause of yielding the white smoke when starting the engine.

Specifically, the following mechanism is going to happen. Because the wall temperature in the combustion chamber is lower than the temperature during a load operation, a part of the fuels attached to the wall surface in the combustion chamber by the fuel injections are not fully evaporated, and are discharged as the white smokes without contributing the combustion. Because the gas temperature/pressure at the compression end becomes lower due to the heat loss, the combustion temperature is lowered and a part of the fuels unattached to the wall surface is unburned and discharged. While these incompletely-combusted fuels are discharged from an air-fuel with the exhaust gas, they become the white smoke with pungent odors. Therefore, two measures such as (1) not crashing the fuels into the wall surface, (2) completely combusting the fuels by raising the temperature of combustion gas become important so as to prevent the white smoke.

The flexibility of the fuel injection is increased due to the current electronic controls, so that the white smoke can be reduced using the above-mentioned measures. This is because the wall temperature in the combustion chamber is estimated by measuring the temperature of the coolant water and when the temperature of the coolant water is lower than the one on a warm-up condition, measures (correction of the water temperature) such as advancement of the injection timing can be taken according to the temperature. Thus, when a proportional relation between the temperature of the coolant water and the wall temperature in the combustion chamber is established, the correcting control of the water temperature is effective.

However, the equilibrium condition is not established, for a few minutes just after the cold start (right after the starting on the cold condition). The wall temperature in the combustion chamber is also equivalent to the temperature of the coolant water before starting and is rapidly warmed up, while the temperature of the coolant water is increased very little. In other words, the equilibrium condition is not established for a certain period of time after the starting.

It was known that the traveling with reduced cylinders is effective in reducing the white smoke, but the traveling with reduced cylinders in which the injections are performed in specific cylinders causes a bias of the temperature (a temperature difference) between the operating cylinders and the quiescent cylinder, thereby causing problems of lowering the credibility and yielding the white smoke from the quiescent cylinder when canceling the traveling with reduced cylinders.

SUMMARY OF THE INVENTION

In consideration to the above-discussed problems, it's an object of the present invention to restrain discharging the white smoke at time lag for the temperature equilibration just after the cold start by controlling the traveling with reduced cylinders according to the idle-speed after the engine starting, as well as to restrain emitting the white smoke by inhibiting biased temperature between the cylinders and by preventing the combustion fluctuation on shifting from the traveling with reduced cylinders to a normal traveling.

In a method for controlling an internal combustion engine of the present invention, which is provided with a coolant water temperature detecting means for detecting the coolant water temperature of the internal combustion engine, a rotation speed detecting means for detecting the rotation speed of the internal combustion engine and a control means for controlling an operation of the internal combustion engine in accordance with the coolant water temperature and the rotation speed, a traveling with reduced cylinders, which reduces the engine cylinders injecting fuels for a certain period of time, is performed, when the internal combustion engine is evaluated that it is in a cold start state and the rotation speed reaches the predetermined rotation speed after the engine starting.

In the method for controlling the internal combustion engine of the present invention, the traveling with reduced cylinders is performed for a certain period of time, by setting up the traveling with reduced cylinders duration time depending on the coolant water temperature at the engine starting, based on the traveling with reduced cylinders duration time map, using the traveling with reduced cylinders duration time map, which sets up the duration time of the traveling with reduced cylinders in accordance with the coolant water temperature at the engine starting.

In the method for controlling the internal combustion engine of the present invention, the traveling with reduced cylinders is performed, until the coolant water temperature reaches the temperature preliminarily set up in a traveling with reduced cylinders downstream temperature map, using the traveling with reduced cylinders downstream temperature map, which sets up the traveling with reduced cylinders downstream temperature corresponding to the coolant water temperature of the internal combustion engine.

In the method for controlling the internal combustion engine of the present invention, the traveling with reduced cylinders is comprised of at least two-stage or more multi-stage fuel injections In the method for controlling the internal combustion engine of the present invention, the injection maps for the traveling with reduced cylinders exclusive use, which are different from the normal traveling map, are used during the traveling with reduced cylinders.

In the method for controlling the internal combustion engine of the present invention, the traveling with reduced cylinders mode of the internal combustion engine delays the main fuel injection starting timing, relative to the timing in the normal traveling mode.

In the method for controlling the internal combustion engine of the present invention, when the internal combustion engine is shifted to the condition equivalent to the load traveling, the traveling with reduced cylinders mode promptly returns to the normal control mode.

In the method for controlling the internal combustion engine of the present invention, the traveling with reduced cylinders mode of the internal combustion engine swiftly returns to the normal control mode when the internal combustion engine increases in speed at the constant rotation speed or more.

In the method for controlling the internal combustion engine of the present invention, which is provided with an accident fire detecting means detecting the accident fire of the internal combustion engine in a combustion chamber, when the internal combustion engine is evaluated that the accident fire or the delayed combustion remains generated at the termination of the traveling with reduced cylinders, the traveling with reduced cylinders is continued for a certain period of time.

The method for controlling the internal combustion engine of the present invention comprises an intake air heating system which heats an intake air introduced into the combustion chamber of the internal combustion engine, wherein the intake air heating system works on the operating cylinders during the traveling with reduced cylinders.

In the method for controlling the internal combustion engine of the present invention, the method comprises a throttle mechanism, consisting of an intake throttle valve for controlling the intake volume to the internal combustion engine or an exhaust throttle valve for controlling the exhaust volume, wherein it is not operated at the traveling with reduced cylinders and is operative after the traveling with reduced cylinders.

In the method for controlling the internal combustion engine of the present invention, the method controlling an electronically-controlled direct fuel injection internal combustion engine performing the traveling with reduced cylinders at the cold starting comprises the step of limiting the duration of traveling with reduced cylinders to a certain period of time after the starting, and changing the operating cylinders and the quiescent cylinders every setting time within the duration of traveling with reduced cylinders.

In the method for controlling the internal combustion engine of the present invention, the method controlling the internal combustion engine with L-typed six cylinders comprises the step of halting alternately 1, 2, 3 cylinder groups and 4, 5, 6 cylinder groups every certain period of time within the duration of the traveling with reduced cylinders.

In the method for controlling the internal combustion engine of the present invention, the method for controlling an internal combustion engine with V-typed multicylinders equipped with two banks comprises the step of halting alternately the cylinders on one bank and those on the other bank every certain period of time within the duration of the traveling with reduced cylinders.

In the method for controlling the internal combustion engine of the present invention, the method comprises the step of providing the predetermined overlap time when the engine cylinders are alternately halted every certain period of time.

In the method for controlling the internal combustion engine of the present invention, the method controlling an electronically-controlled direct fuel injection internal combustion engine performing the traveling with reduced cylinders at the cold starting comprises the step of limiting the duration of traveling with reduced cylinders to a certain period of time after the starting, and changing gradually a fuel injection quantity ratio between the operating cylinder and the quiescent cylinder after the elapse of the certain period of time.

In the method for controlling the internal combustion engine of the present invention, the method comprises the step of injecting a small amount of fuels into the side of the quiescent cylinders after the elapse of the certain period of time.

In the method for controlling the internal combustion engine of the present invention, the method comprises the step of reversing the ratio of the fuel injection quantities in the quiescent and operating engine cylinders after the lapse of the certain period of time.

In the method for controlling the internal combustion engine of the present invention, the method comprises the step of changing gradually the ratio of the fuel injection quantities in the quiescent and operating engine cylinders after the lapse of a certain period of time, so that it is finally being equivalent to the quantity in the normal traveling.

In the method for controlling the internal combustion engine of the present invention, the method comprises the step of returning swiftly to the normal traveling mode when the internal combustion engine is evaluated that it is on the load operation mode or increases in speed, under the operating condition until a lapse of a certain period of time after the duration of the traveling with reduced cylinders, whichever are described above.

In a method for controlling an internal combustion engine of the present invention, since the injection quantity per one cylinder engine is increased (a equivalence ratio is increased) and the combustion temperature is increased, by reducing the number of the engine cylinders injecting fuels for the period of time, the combustion condition is improved, and the white smoke at the starting and right after the starting can be prevented.

In the method for controlling the internal combustion engine of the present invention, as the combustion condition just after the starting, having the problem of the white smoke, is intensively improved due to a time map, thereby effectively preventing the white smokes.

In the method for controlling the internal combustion engine of the present invention, as the combustion condition just after the starting, having the problem of the white smoke, is intensively improved due to a temperature map, thereby effectively preventing the white smoke.

In the method for controlling the internal combustion engine of the present invention, the attachment of the fuels on the wall surface in the combustion chamber is restrained during the fuel injection and the injected fuels are steadily ignited on a low wall temperature condition, thereby reducing the generation of the white smoke In the method for controlling the internal combustion engine of the present invention, the optimal injection pattern during the traveling with reduced cylinders can be selected.

In the method for controlling the internal combustion engine of the present invention, the noise can be lowered, by delaying the main injection.

In the method for controlling the internal combustion engine of the present invention, regular engine specifications can be exerted, by shifting from the traveling with reduced cylinders to the normal traveling, as soon as the cause of the white smoke emission is dissolved.

In the method for controlling the internal combustion engine of the present invention, the regular engine specifications can be swiftly exerted, by shifting from the traveling with reduced cylinders to the normal traveling.

In the method for controlling the internal combustion engine of the present invention, the hunting and the increases in the white smoke during the control transfer due to the fuel property can be restrained, and the traveling with reduced cylinders can be canceled after the engine has been warmed up to the level enough to endure the injections by all engine cylinders.

In the method for controlling the internal combustion engine of the present invention, as heating energy assigned to the quiescent cylinder can be transferred to the operating cylinder, dissipation power having the constant and advantageous effect can be acquired.

In the method for controlling the internal combustion engine of the present invention, the generation of the black smoke is prevented.

In the method for controlling the internal combustion engine of the present invention, the white smoke at the starting and right after the starting can be restrained, as well as the increase in the white smoke on shifting from the traveling with reduced cylinders to the normal traveling can be suppressed.

In the method for controlling the internal combustion engine of the present invention, combustion noise can be restrained without the large vibration unbalance of the engine In the method for controlling the internal combustion engine of the present invention, the generation of the engine stall can be prevented.

In the method for controlling the internal combustion engine of the present invention, as heating energy assigned to the quiescent cylinder can be transferred to the operating cylinder, dissipation power having the constant and advantageous effect can be acquired.

In the method for controlling the internal combustion engine of the present invention, the white smokes are not readily generated when shifting from the traveling with reduces cylinders to the normal traveling.

The method for controlling an internal combustion engine of the present invention can rapidly raise the wall temperature in the combustion chamber and swiftly return the traveling with reduces cylinders to the normal traveling.

The method for controlling the internal combustion engine of the present invention can forestall troubles due to the engine load or the like.

BRIEF DESCRIPTION OF THE DRAWINGS

FIG. 13 is a diagram showing an embodiment in case of operating only 1, 2 and 3 groups out of six-cylinder engine.

DETAILED DESCRIPTION OF THE INVENTION

Embodiments of the present invention will be described.

Figure 1:
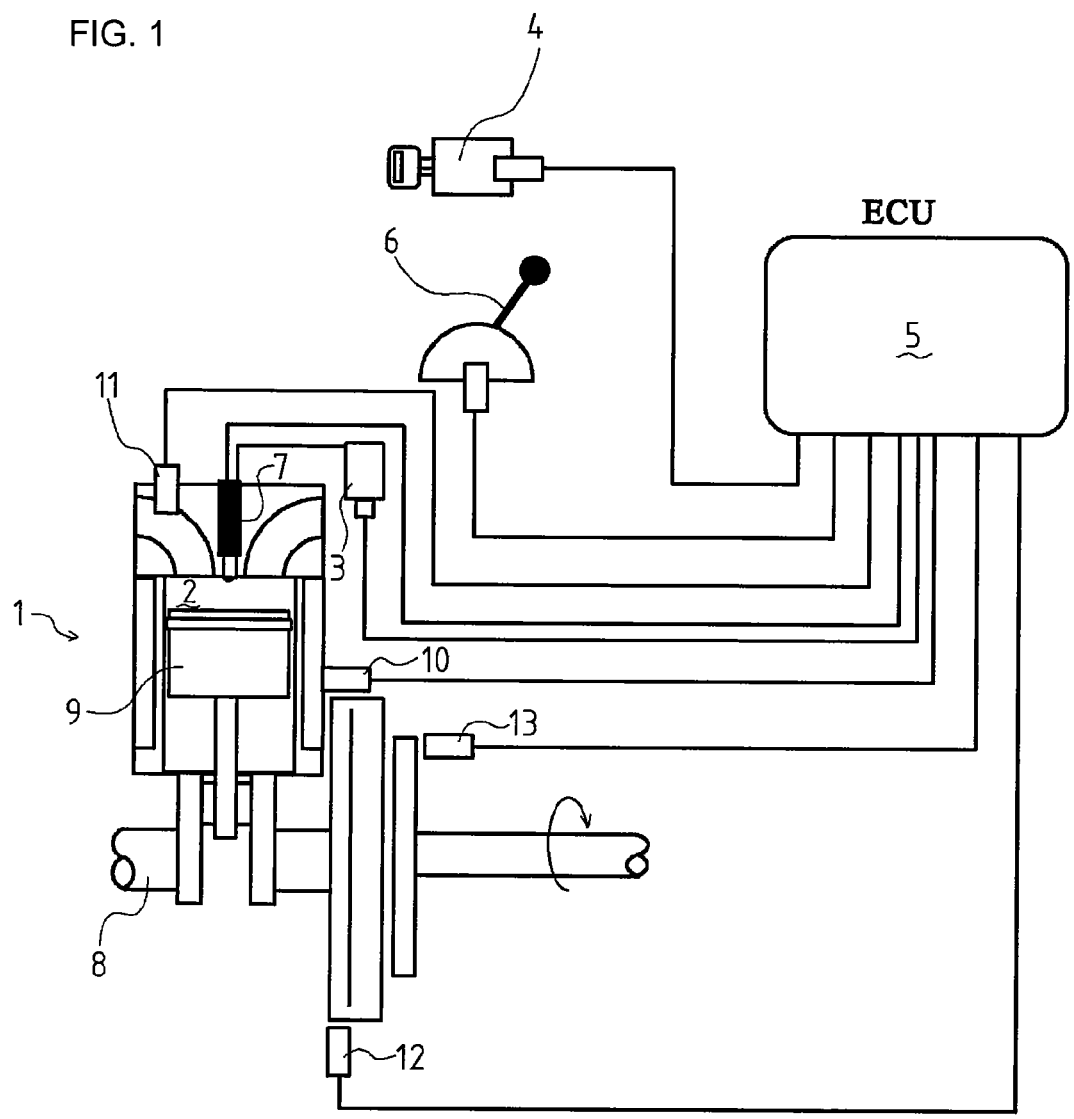
FIG. 1 is a schematic diagram of a construction of a control system in a direct fuel-injection diesel engine according to the present invention.
Figure 2:
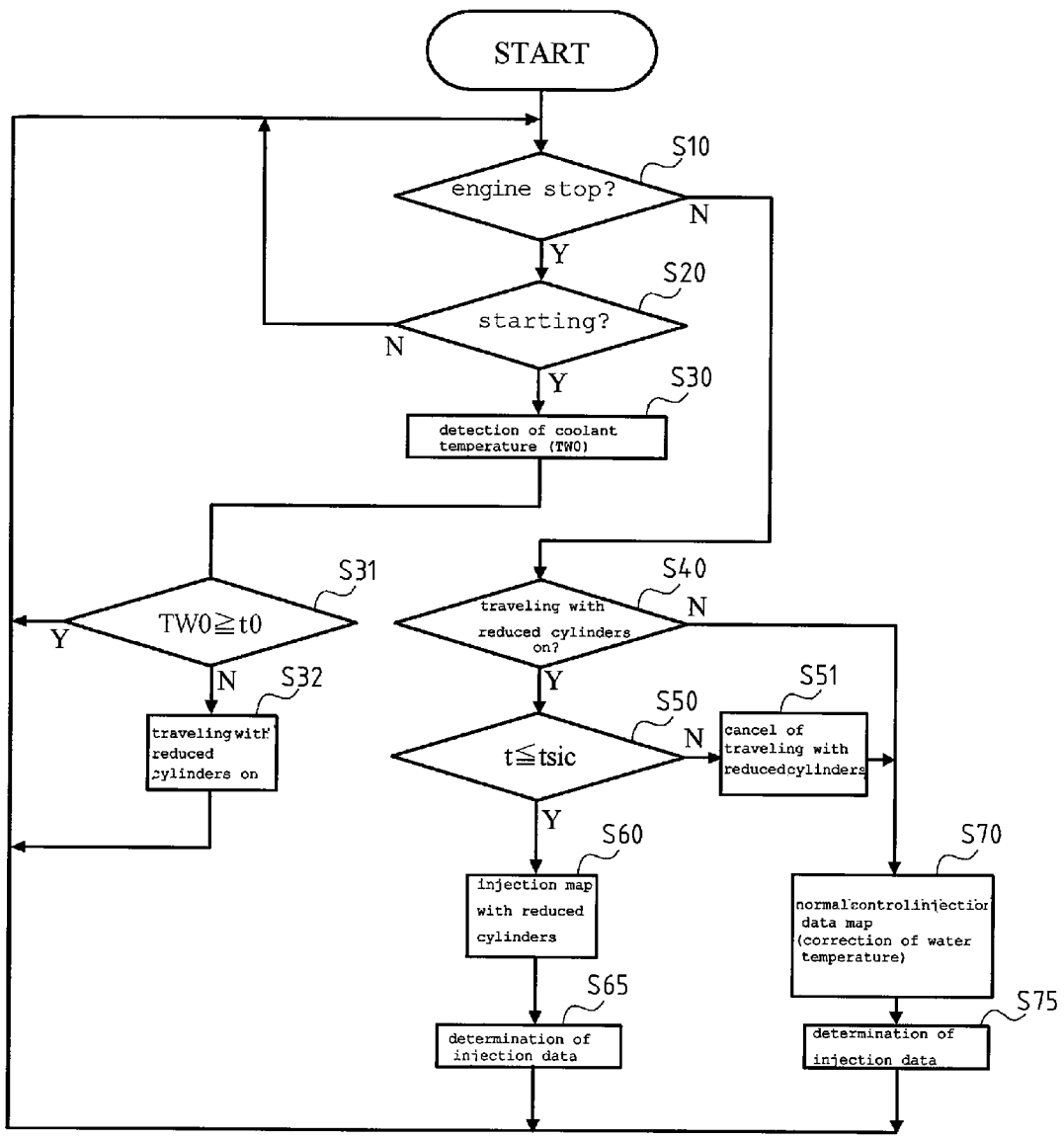
FIG. 2 is a flow diagram of an engine control.
Figure 3:
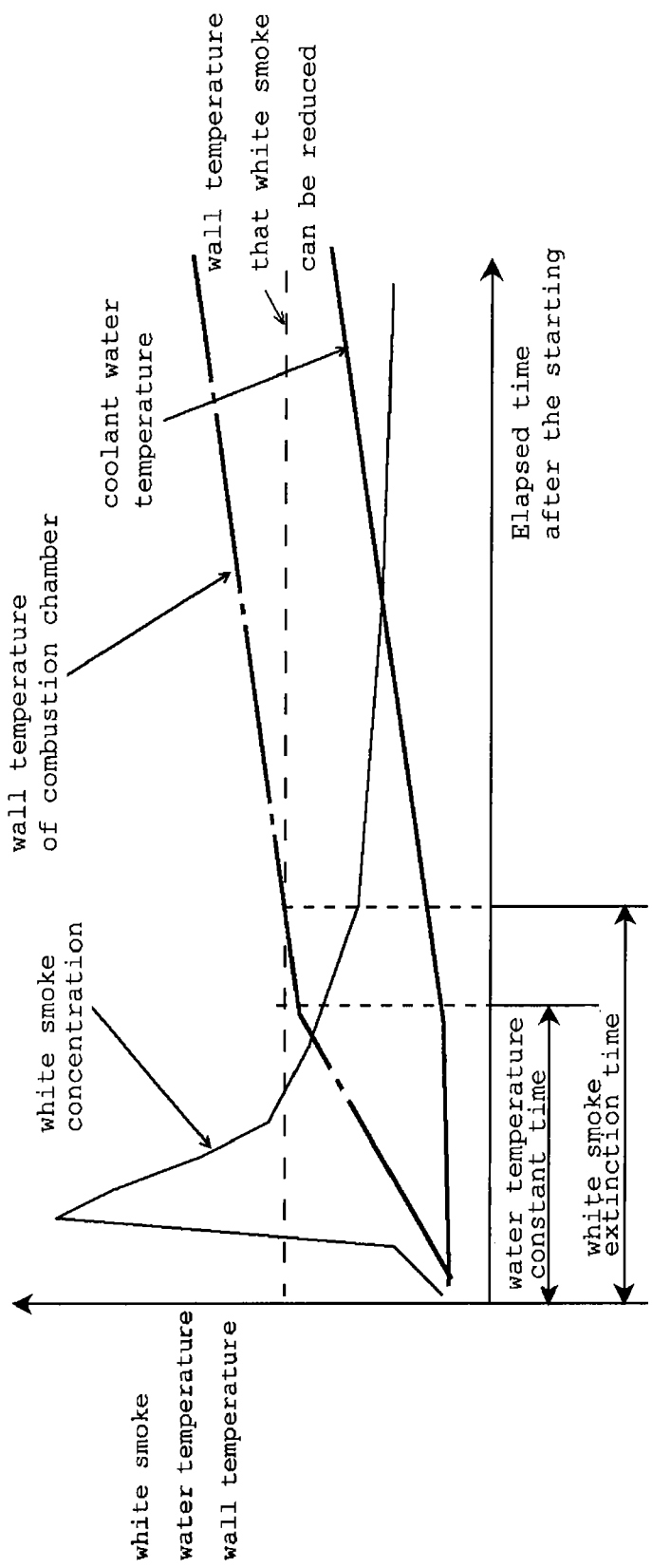
FIG. 3 is a diagram of showing a generation behavior of white smokes during a normal traveling.
Figure 4:
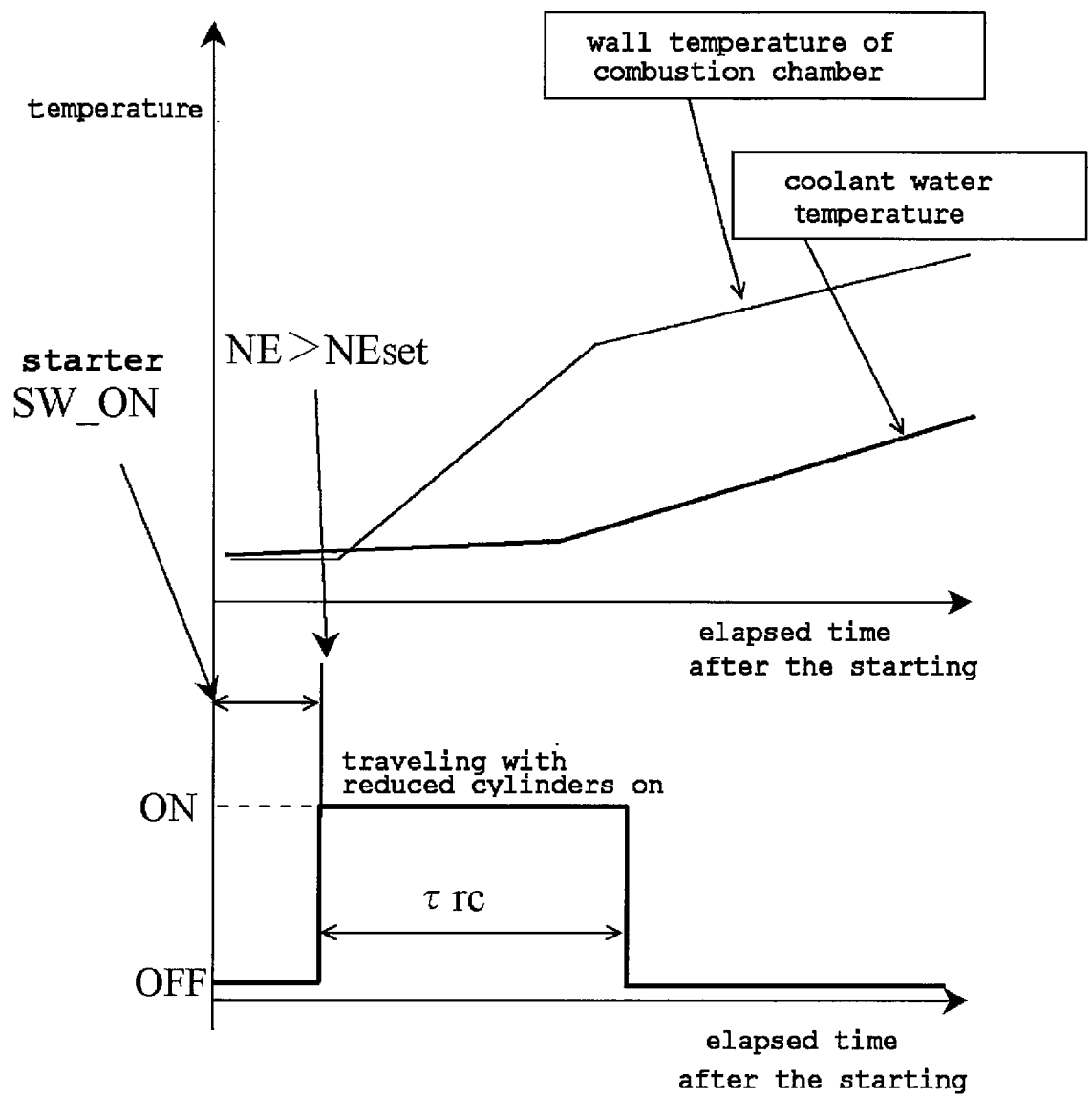
FIG. 4 is a diagram showing an example of controlling a traveling with reduced cylinders.
Figure 5:
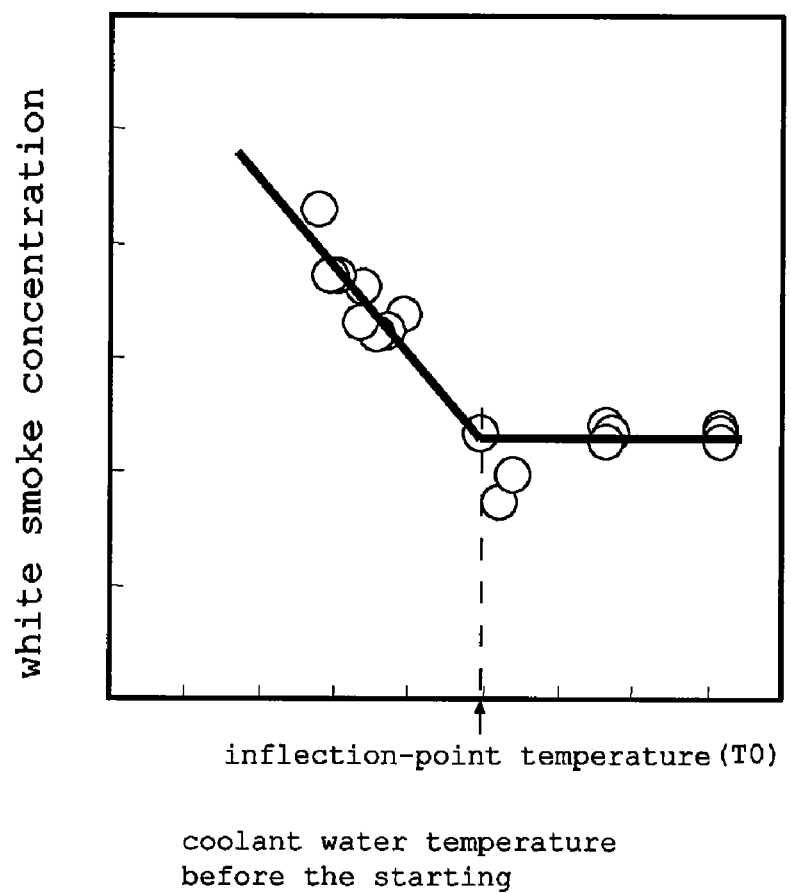
FIG. 5 is a diagram showing a correlation between a temperature of coolant water before starting and white smoke density.
Figure 6:
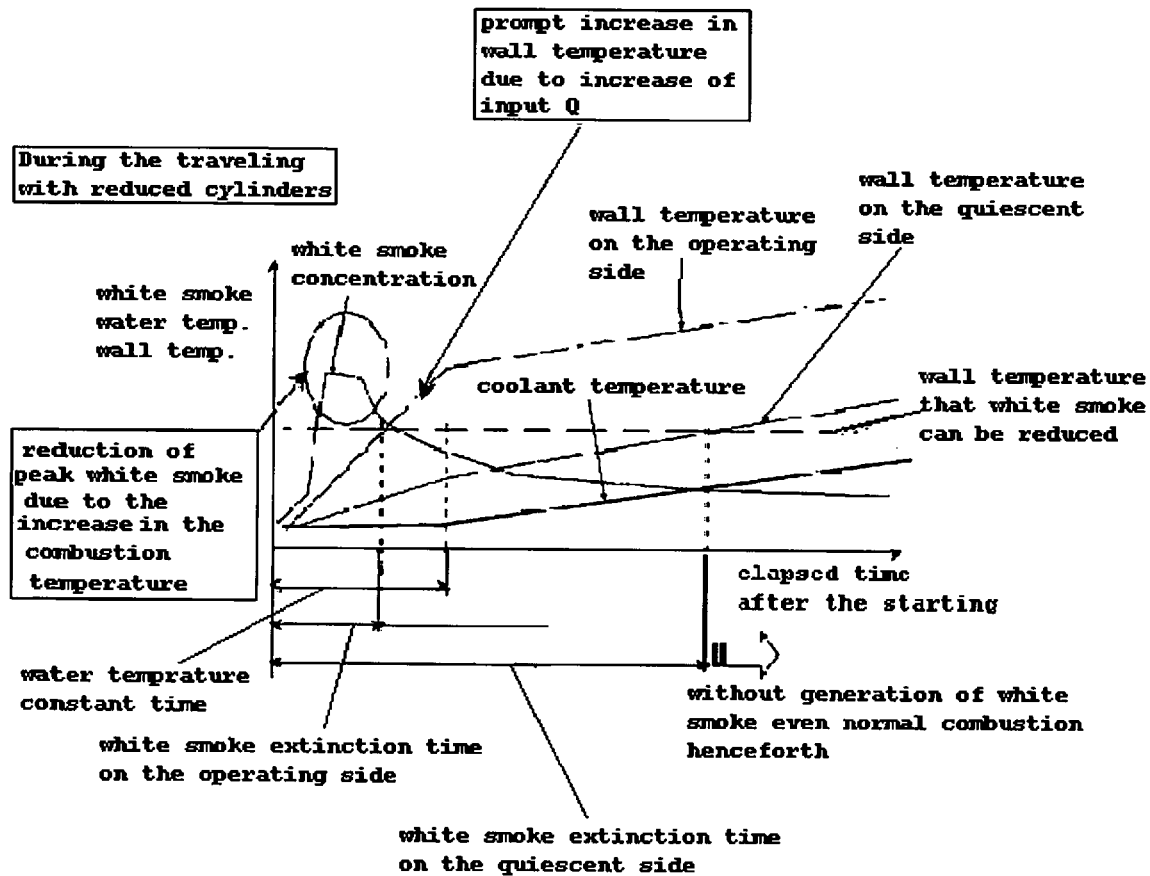
FIG. 6 is a diagram of showing a generation behavior of white smoke during the traveling with reduced cylinders.
Figure 7:
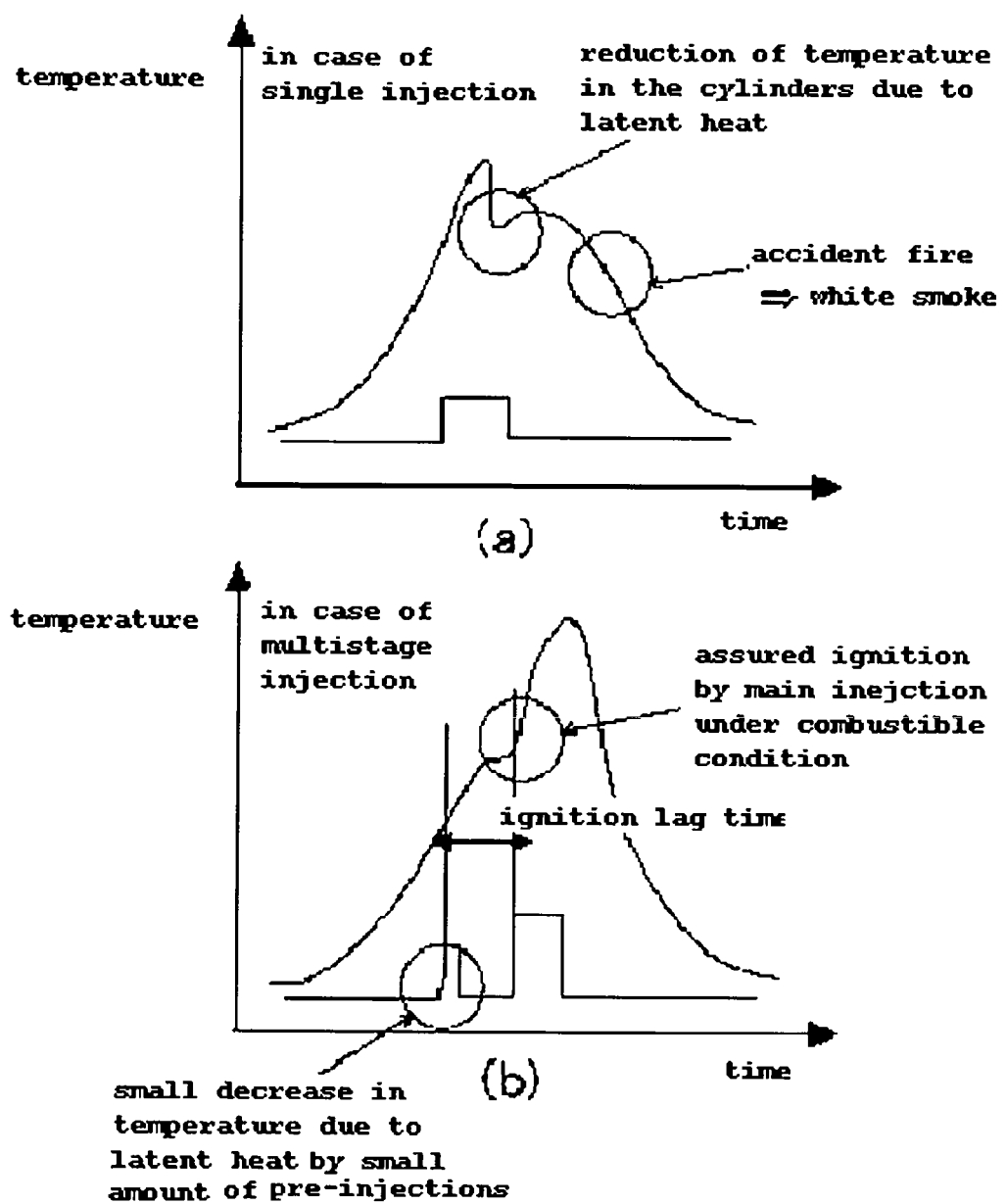
FIG. 7 is a diagram showing temporal change of a temperature in a combustion chamber.
Figure 8:
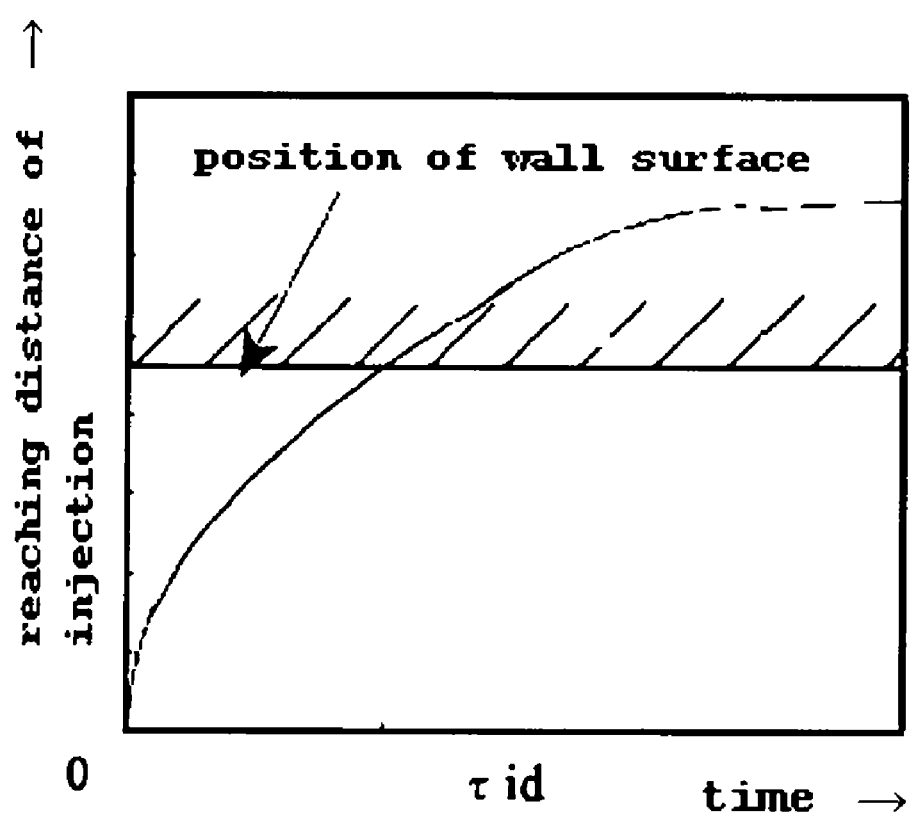
FIG. 8 is a diagram showing a correlation between a reaching distance of fuels and time while injecting the fuels by single stage injection.
Figure 9:
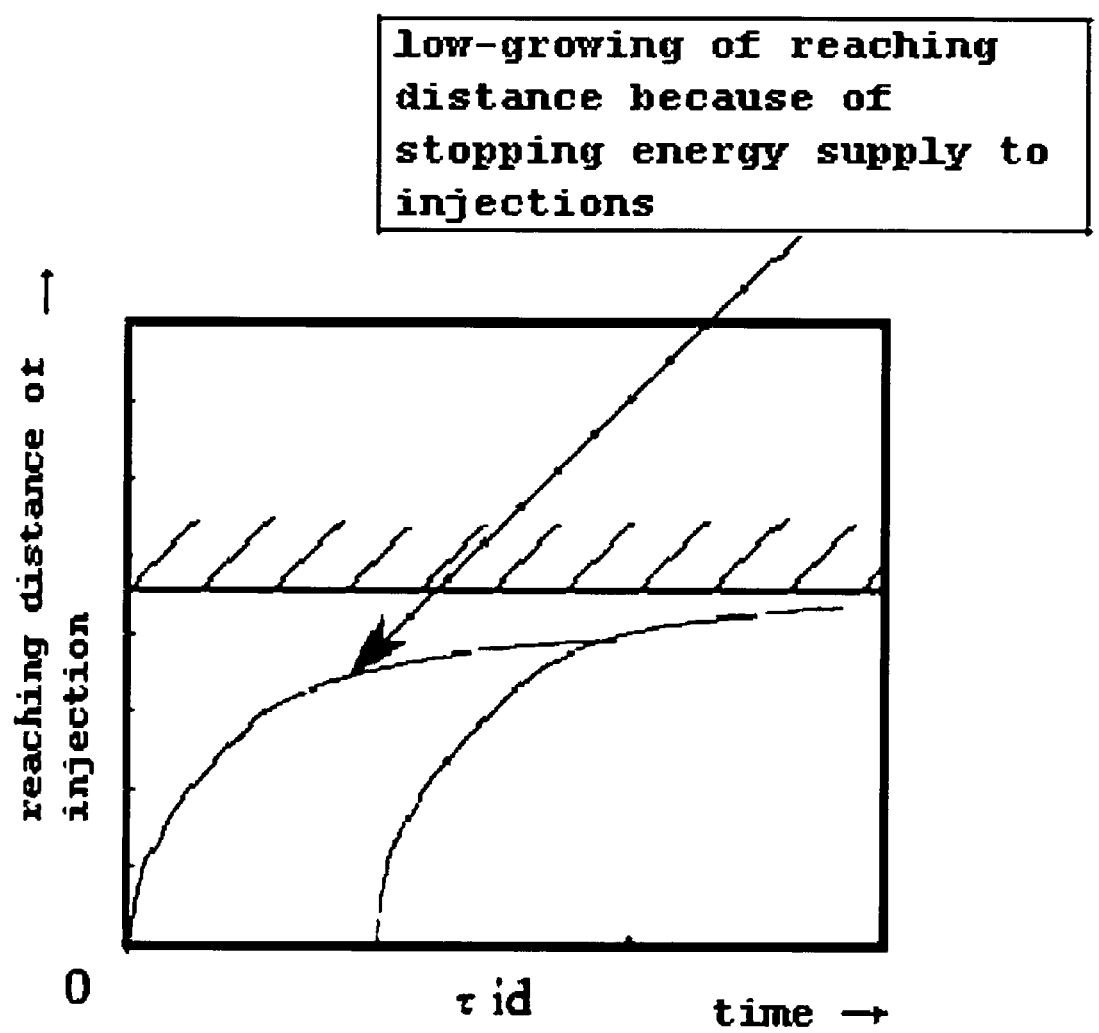
FIG. 9 is a diagram showing a correlation between a reaching distance of fuels and time while injecting the fuels by multistage injection.
Figure 10:
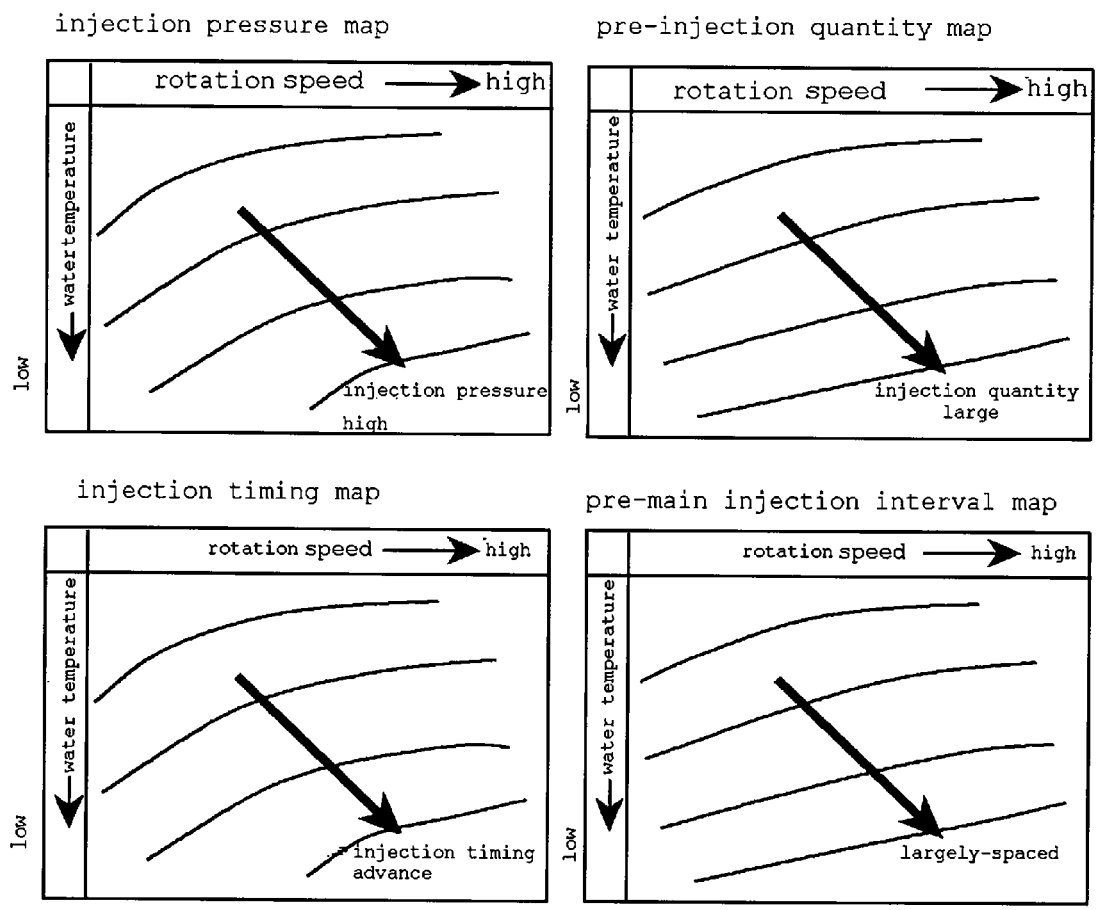
FIG. 10 is a diagram showing examples of maps of injection with reduced cylinders.
Figure 11:
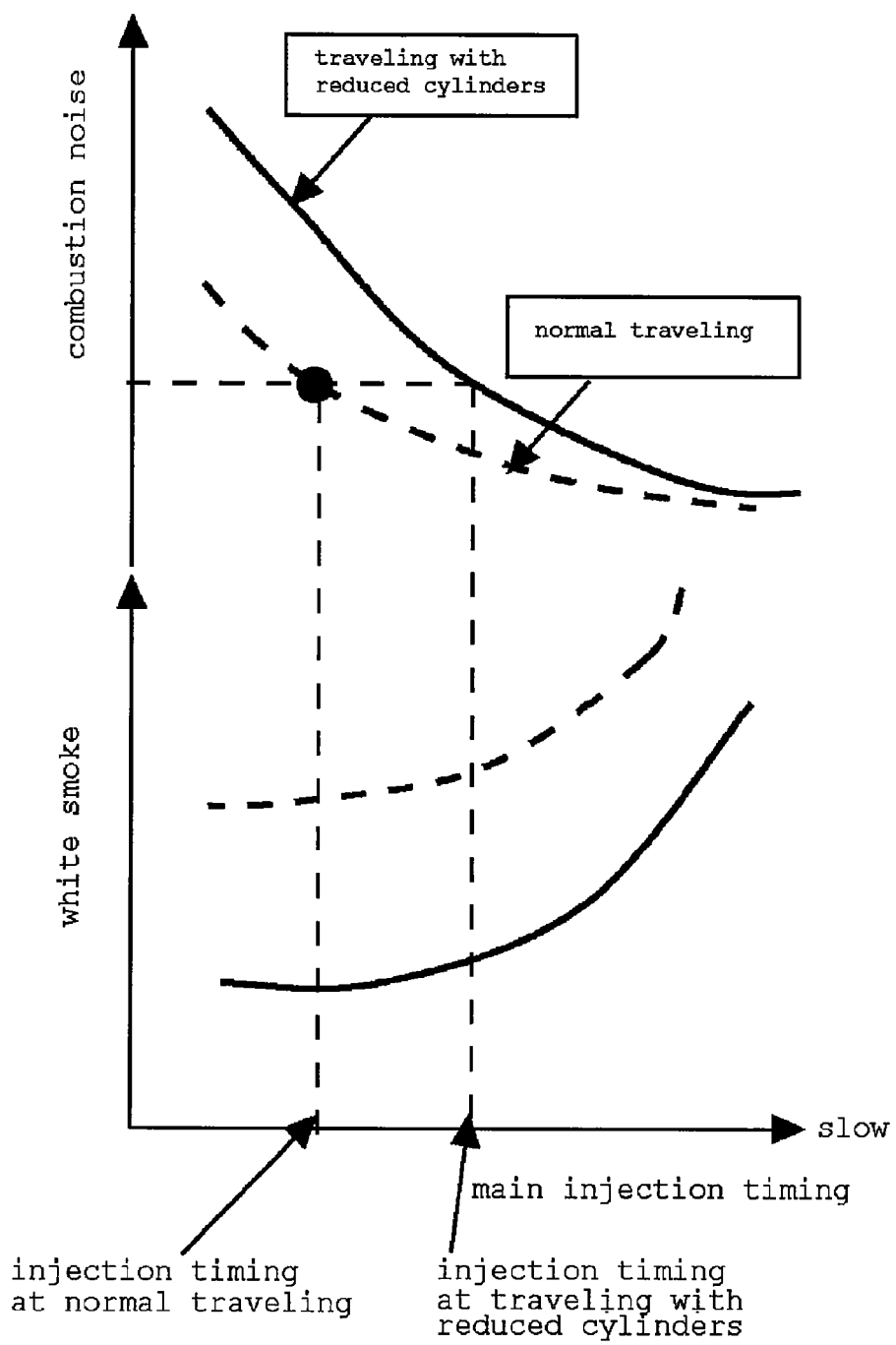
FIG. 11 is a diagram showing a correlation between the injection timing and a noise/white smoke.
Figure 12:
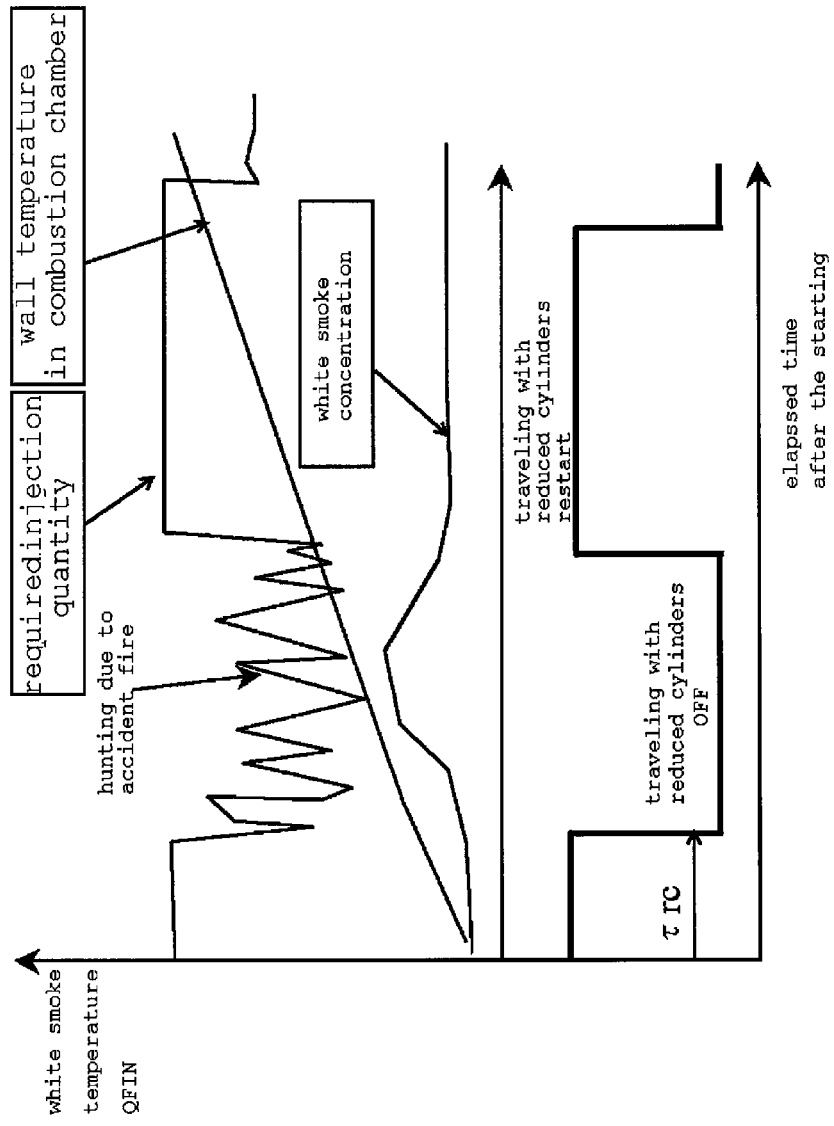
FIG. 12 is a diagram showing a reintroduction of the traveling with reduced cylinders by detecting an accident fire.
Figure 14:
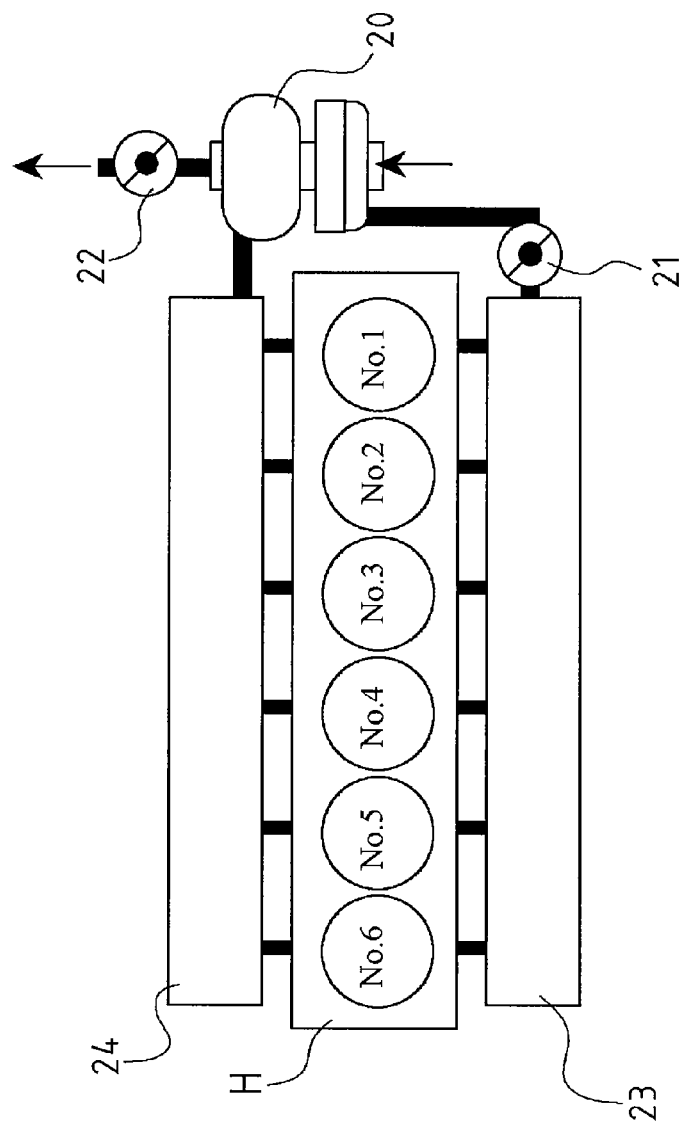
FIG. 14 is a diagram of configuration examples of an intake throttle valve/exhaust throttle valve.
Figure 15:
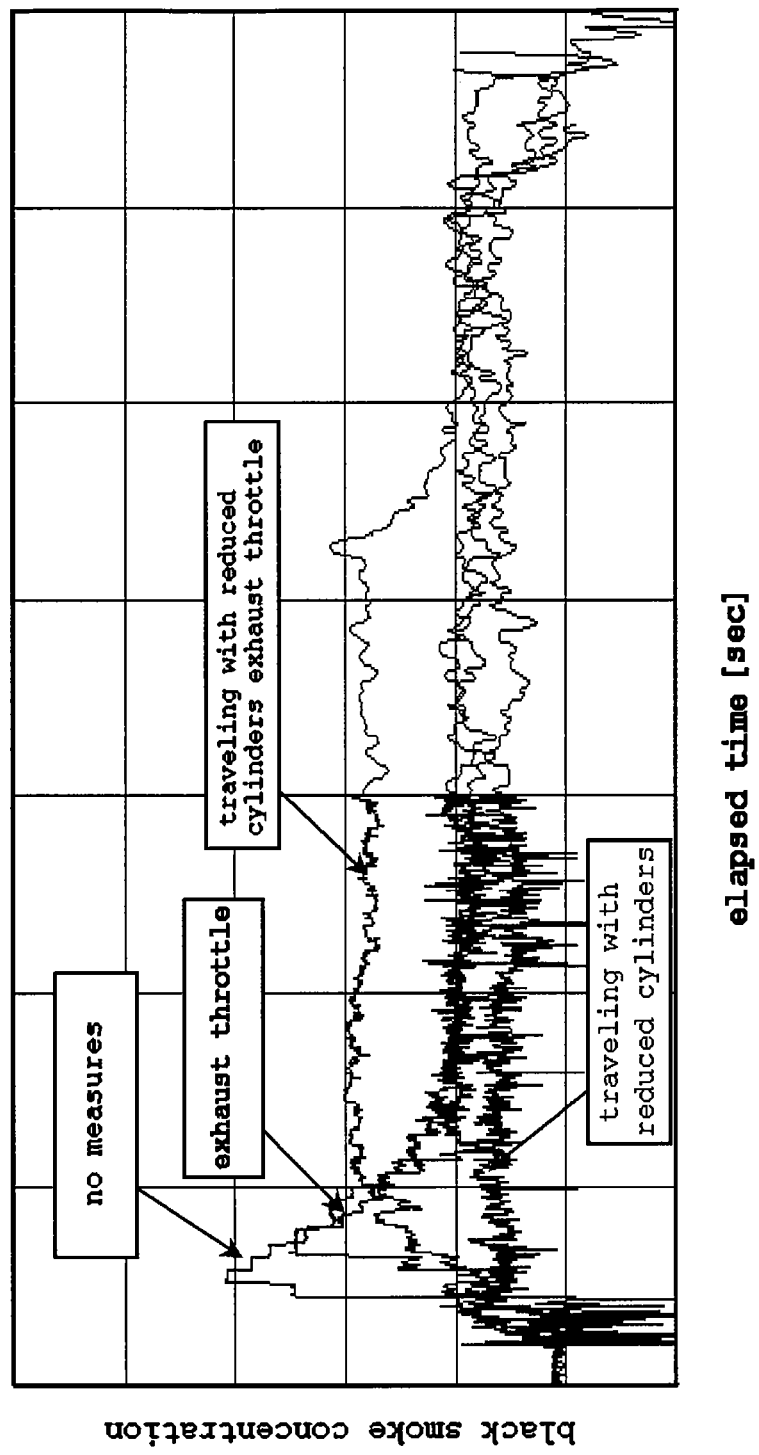
FIG. 15 is a diagram showing cases of deterioration of combustion during the traveling with reduced cylinders using the exhaust throttle valve.
Figure 16:
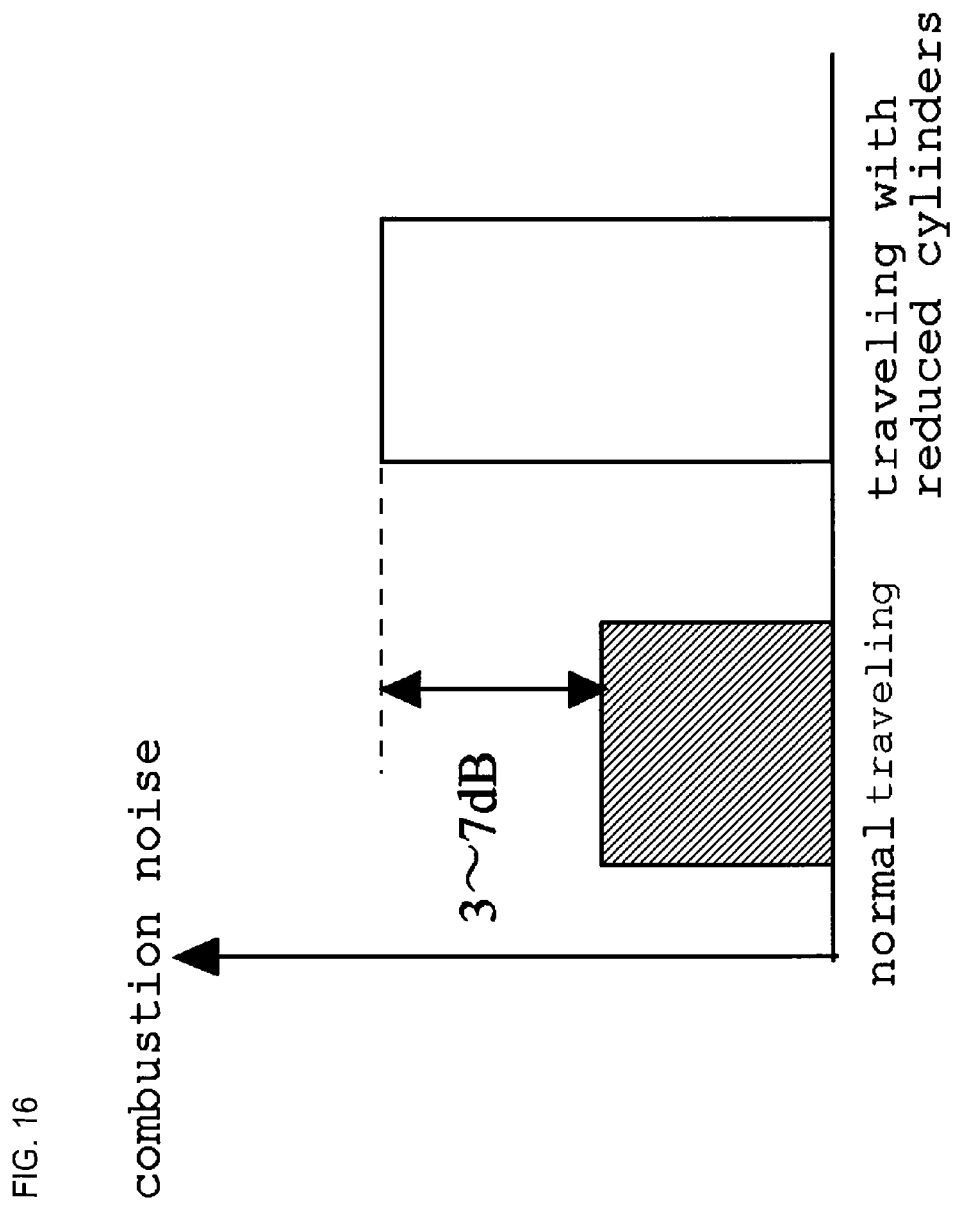
FIG. 16 is a diagram showing the combustion noise at the traveling with reduced cylinders.
Figure 17:
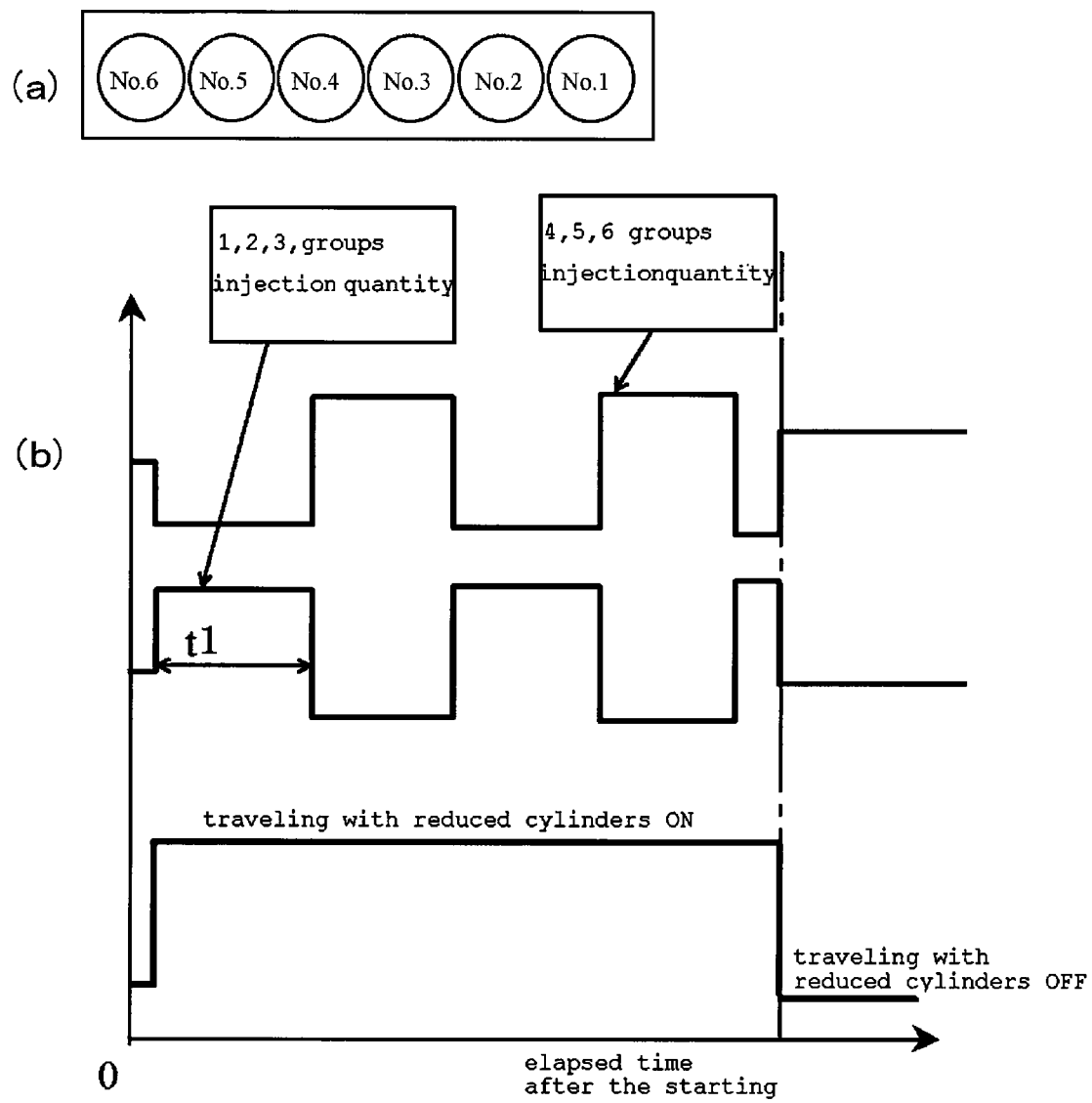
FIG. 17 is a diagram showing the switching control in case of the in-line six cylinder engine.
Figure 18:
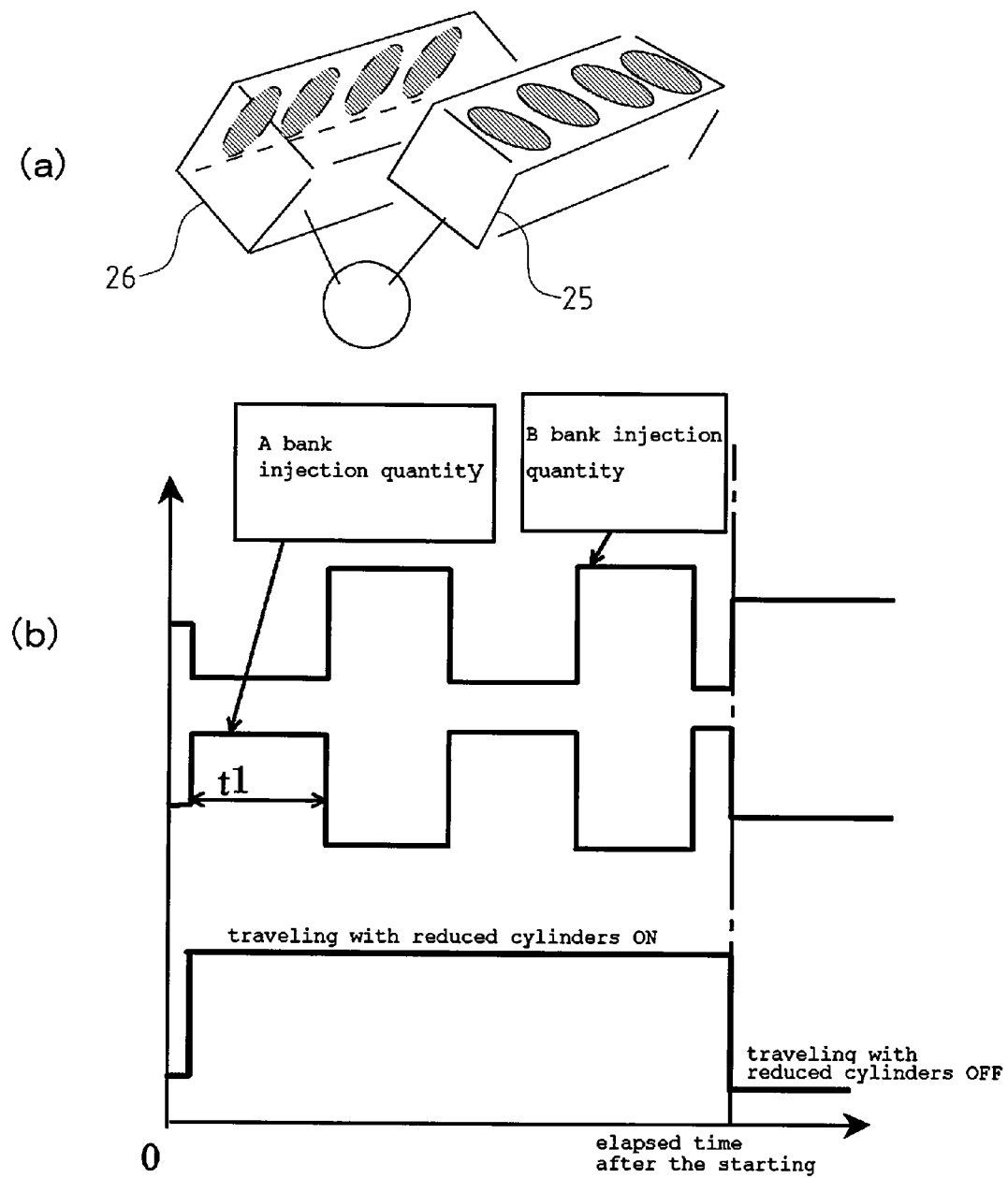
FIG. 18 is a diagram showing the switching control in case of V-typed eight cylinder engine.
Figure 19:
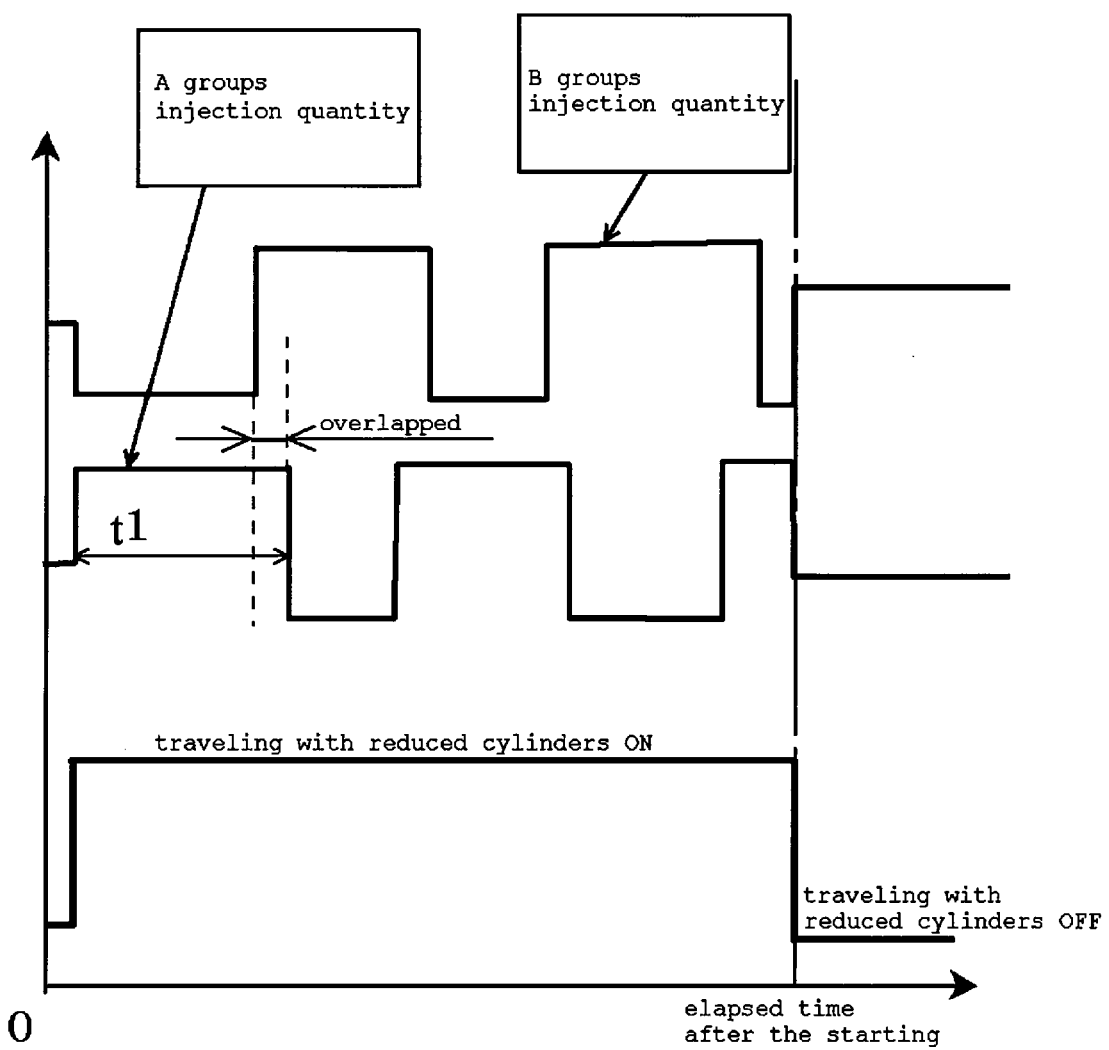
FIG. 19 is a diagram showing the overlap control when shifting the operating cylinders.
Figure 20:
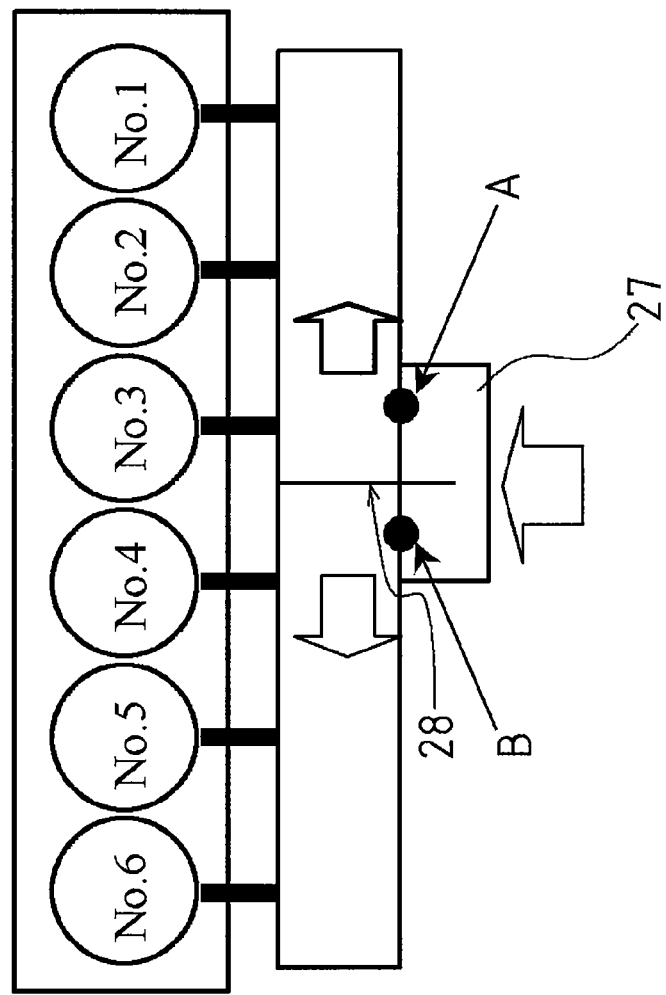
FIG. 20 is a diagram of an embodiment when traveling by switching the 1, 2, 3 cylinder groups to the 4, 5, 6 cylinder groups in the in-line six cylinder engine.
Figure 21:
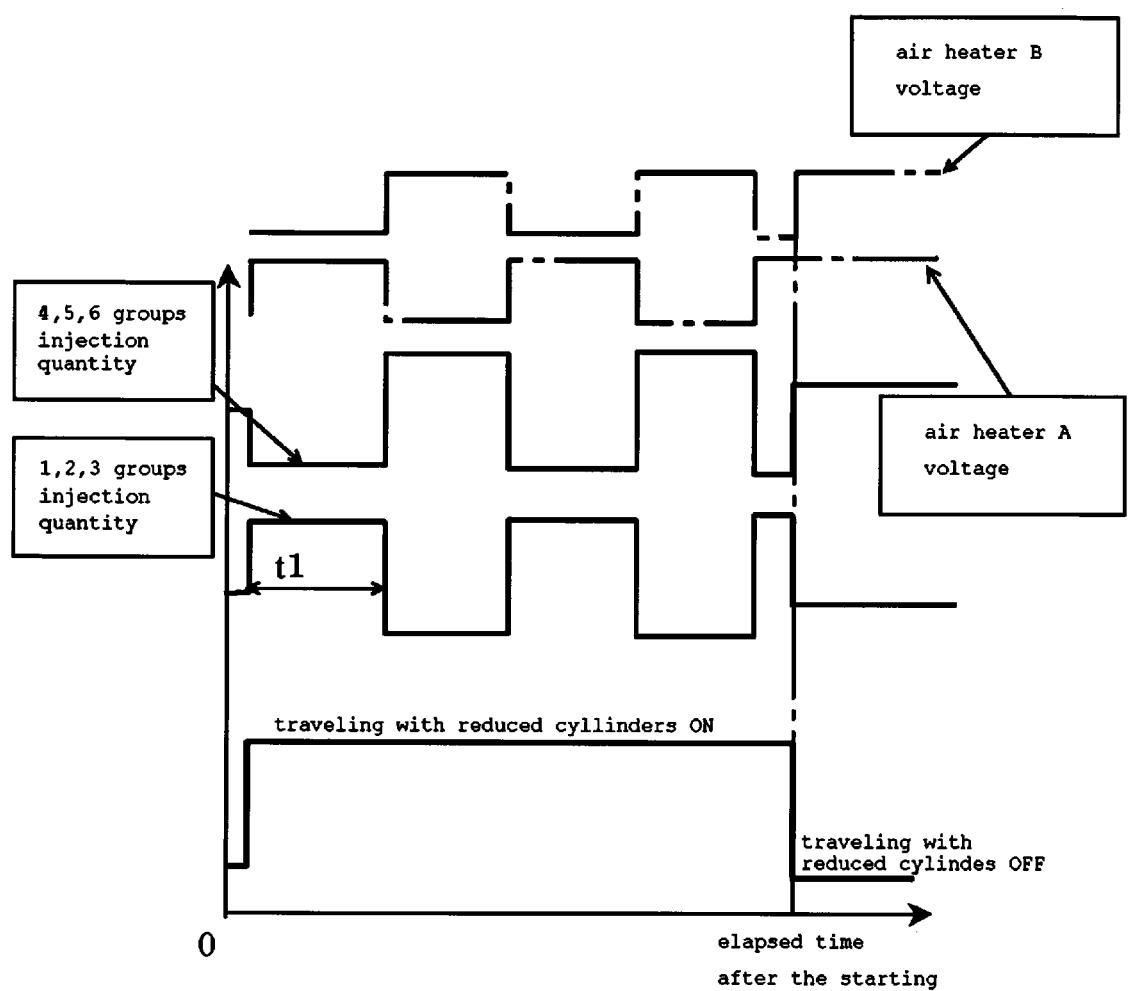
FIG. 21 is a diagram of an operation example of an air heater in the in-line six cylinder engine.
Figure 22:
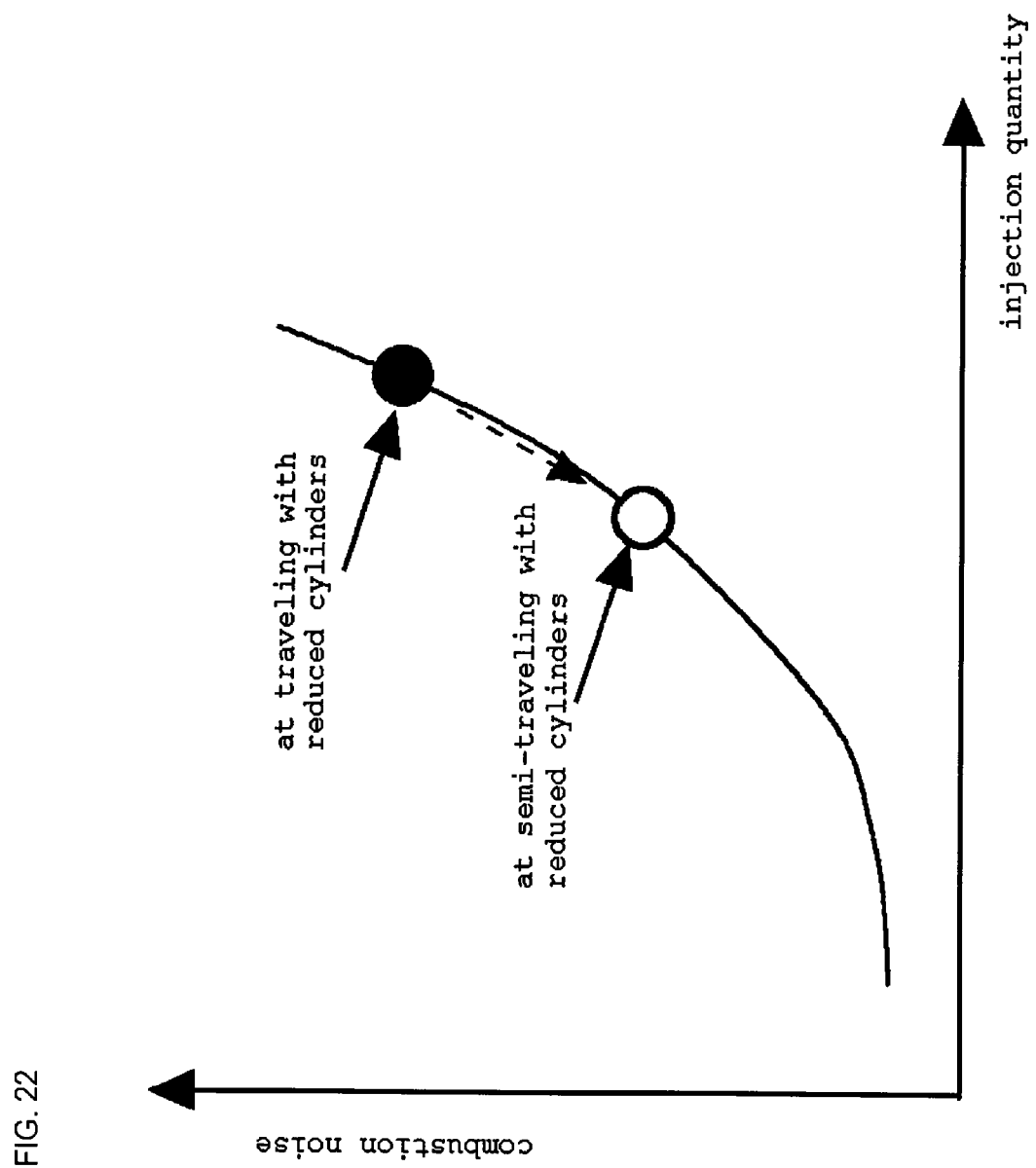
FIG. 22 is a diagram showing a relationship between the fuel injection quantity per cylinder engine and the combustion noise.
Figure 23:
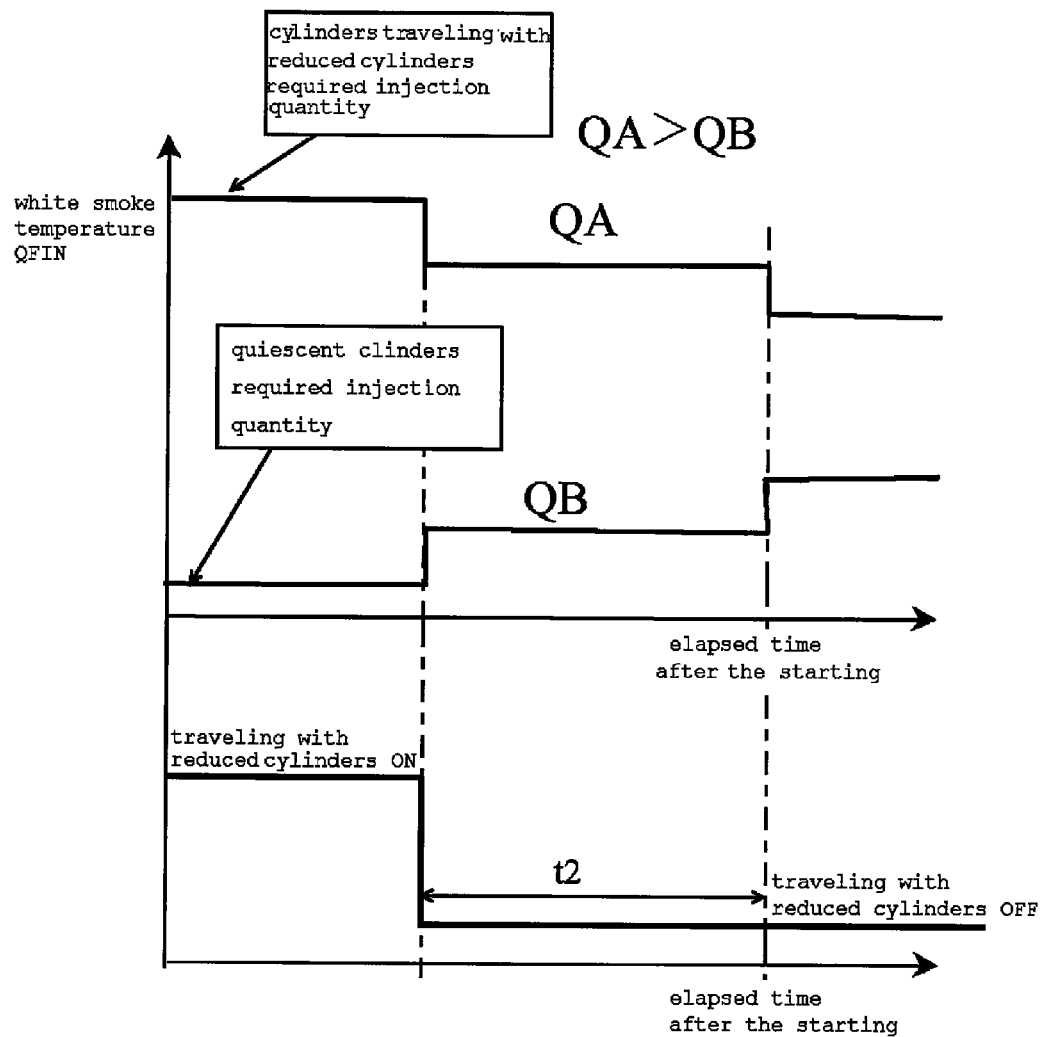
FIG. 23 is a diagram showing an example (A) of switching control from the traveling with reduced cylinders to the normal traveling.
Figure 24:
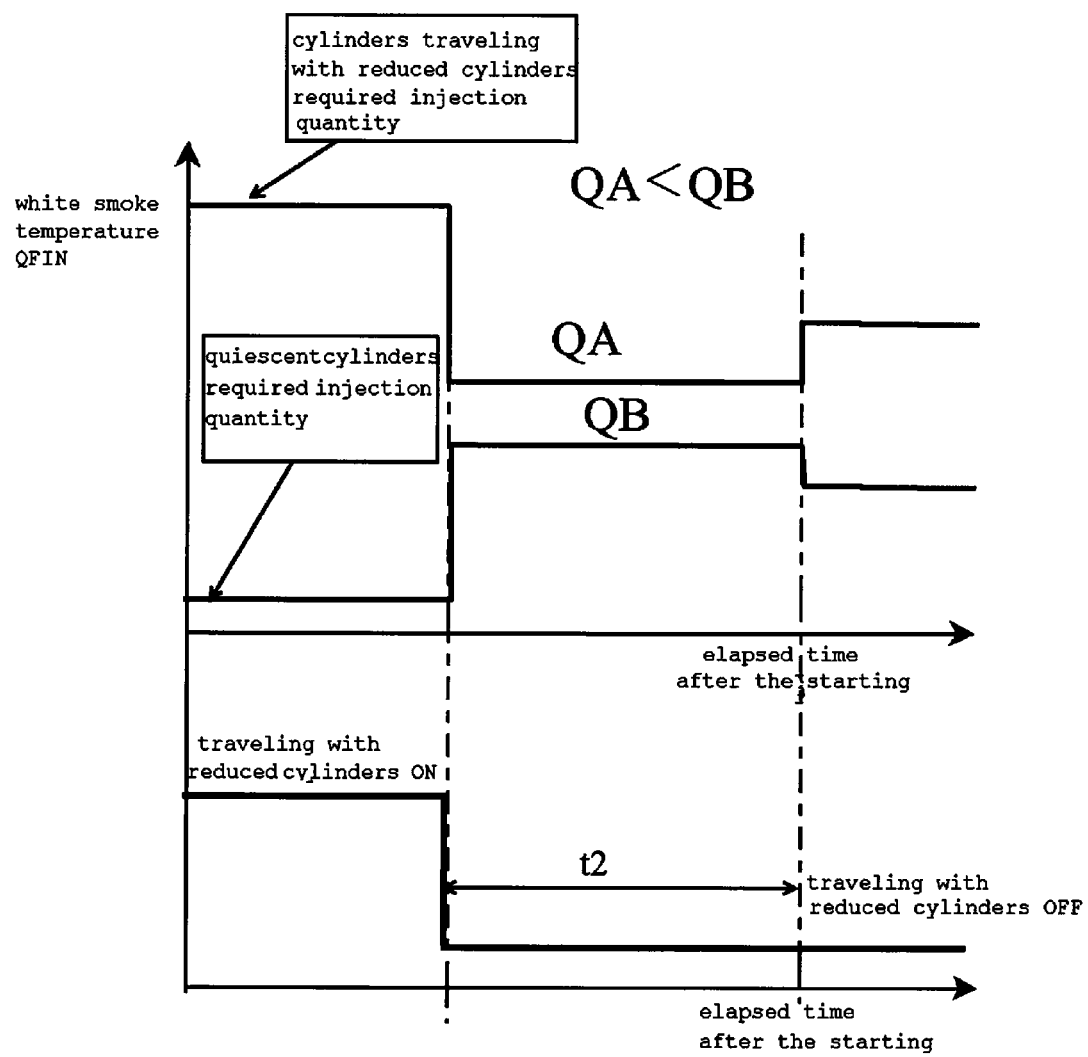
FIG. 24 is a diagram showing an example (B) of switching control from the traveling with reduced cylinders to the normal traveling.
Figure 25:
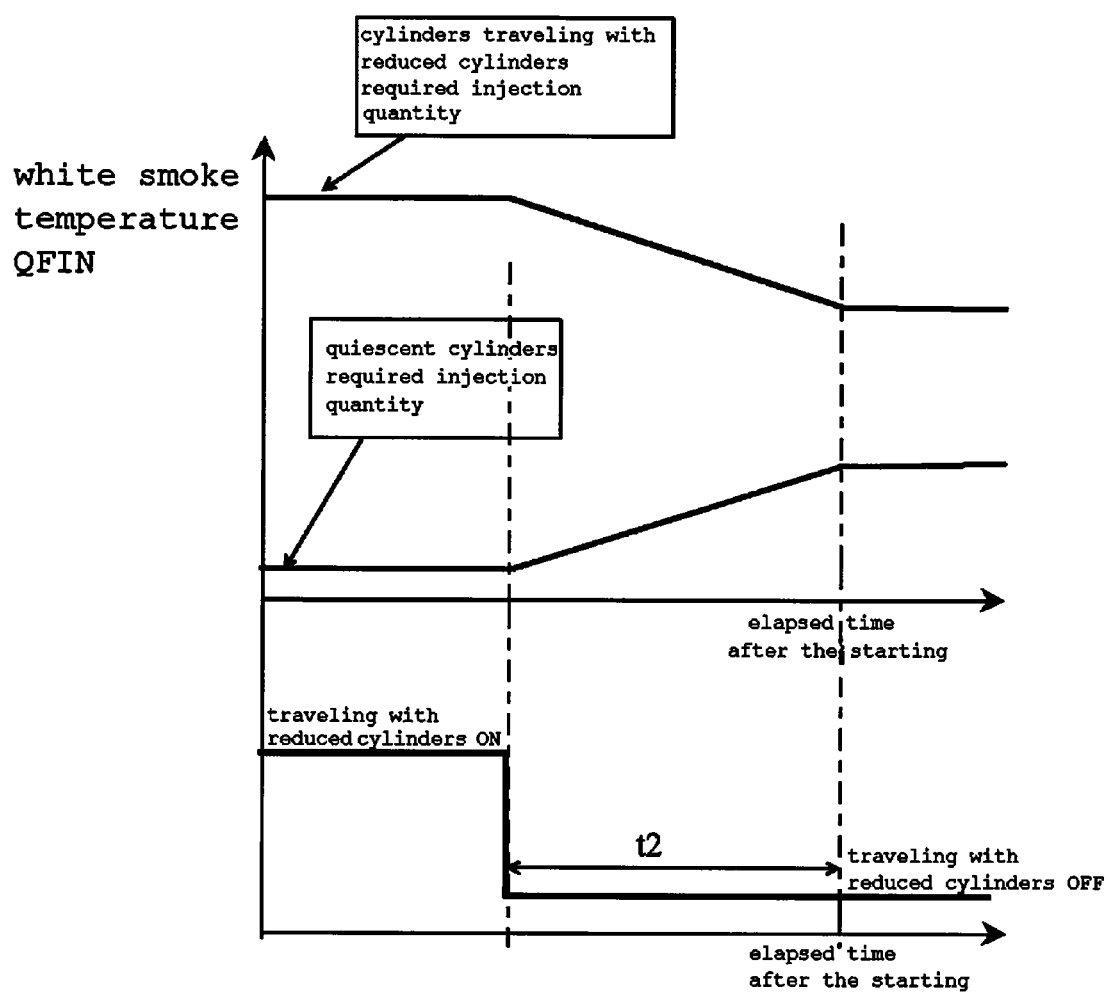
FIG. 25 is a diagram showing an example (C) of switching control from the traveling with reduced cylinders to the normal traveling.
Figure 26:
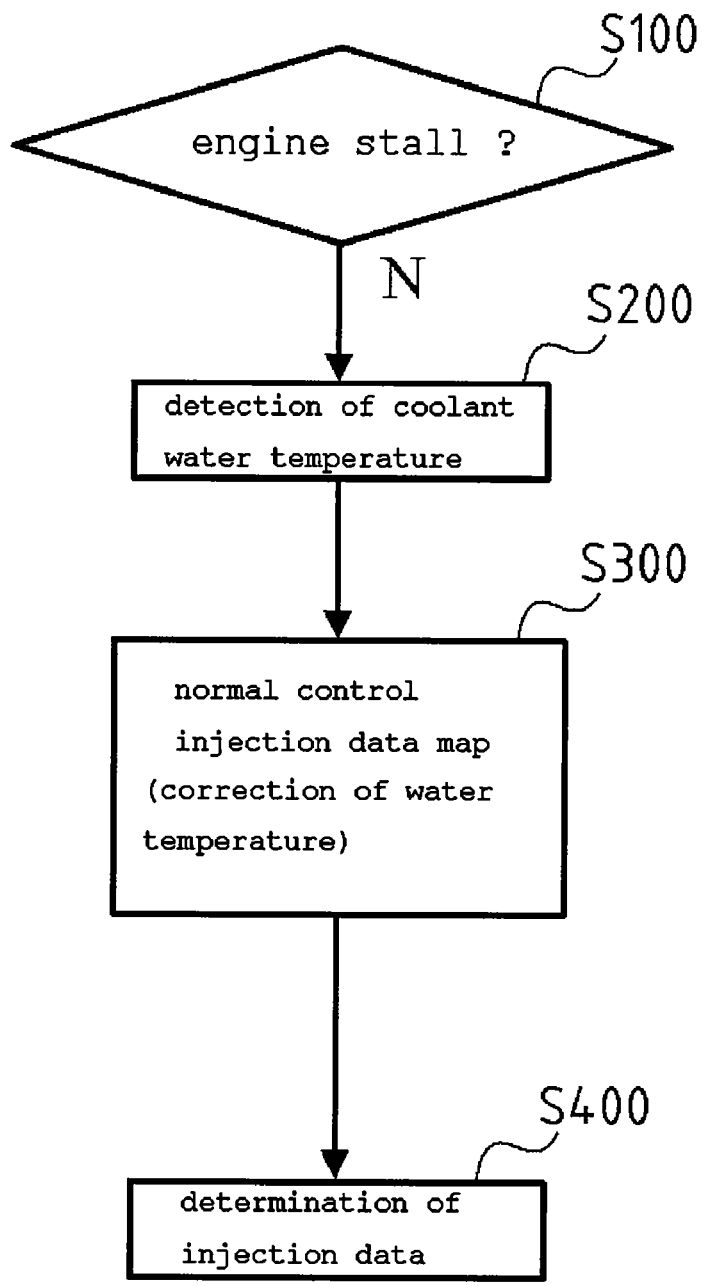
FIG. 26 is a diagram showing the conventional control flow of the engine.

FIG. 1 is a schematic diagram of a construction of a control system in a direct fuel-injection diesel engine according to the present invention. FIG. 2 is a flow diagram of an engine control. FIG. 3 is a diagram showing a generation behavior of white smoke during a normal traveling. FIG. 4 is a diagram showing an example of controlling a traveling with reduced cylinders. FIG. 5 is a diagram showing a correlation between a temperature of coolant water before starting and white smoke density. FIG. 6 is a diagram showing a generation behavior of white smoke during the traveling with reduced cylinders. FIG. 7 is a diagram showing temporal change of a temperature in a combustion chamber. FIG. 8 is a diagram showing a correlation between a reaching distance of fuels and time while injecting the fuels by single stage injection. FIG. 9 is a diagram showing a correlation between a reaching distance of fuels and time while injecting the fuels by multistage injection. FIG. 10 is a diagram showing examples of maps of injection with reduced cylinders. FIG. 11 is a diagram showing a correlation between an injection timing and a noise/white smoke. FIG. 12 is a diagram showing a reintroduction of the traveling with reduced cylinders by detecting an accident fire FIG. 13 is a diagram showing the embodiment in case of operating only 1, 2 and 3 groups out of six-cylinder engine. FIG. 14 is a diagram of configuration examples of an intake throttle valve/exhaust throttle valve. FIG. 15 is a diagram showing cases of deterioration of combustion during the traveling with reduced cylinders using the exhaust throttle valve. FIG. 16 is a diagram showing the combustion noise at the traveling with reduced cylinders. FIG. 17 is a diagram showing the switching control in case of the in-line six cylinder engine. FIG. 18 is a diagram showing the switching control in case of V-typed eight cylinder engine. FIG. 19 is a diagram showing the overlap control when shifting the operating cylinders. FIG. 20 is a diagram of an embodiment when traveling by switching the 1, 2, 3 cylinder groups to the 4, 5, 6 cylinder groups in the in-line six cylinder engine. FIG. 21 is a diagram of an operation example of an air heater in the in-line six cylinder engine. FIG. 22 is a diagram showing a relationship between the fuel injection quantity per cylinder engine and the combustion noise. FIG. 23 is a diagram showing an example (A) of switching control from the traveling with reduced cylinders to the normal traveling. FIG. 24 is a diagram showing an example (B) of switching control from the traveling with reduced cylinders to the normal traveling. FIG. 25 is a diagram showing an example (C) of switching control from the traveling with reduced cylinders to the normal traveling. FIG. 26 is a diagram showing the conventional control flow of the engine.

A skeleton framework of a control system of an electronically-controlled direct fuel injection diesel engine 1 as an embodiment of an internal combustion engine to which the present invention is applied will be described. As shown in FIG. 1, the control system of the direct fuel injection diesel engine (hereinafter, referred to as "an engine") mainly comprises en engine 1, a supply pump, an accelerator lever 6, a starter switch 4 and an ECU 5 or the like.

The engine 1 is provided with the supply pump, a common rail 3, an injector 7, a piston 9, a starter (not shown), a coolant water temperature sensor 10 as a coolant water temperature detecting means, an intake air temperature sensor, a pickup sensor 12 as an example of a rotation speed detecting means of the engine 1 and a clutch sensor 13 detecting the on/off operation of the clutch. The starter rotates a crankshaft 8 via a flywheel of the engine 1 at the engine starting. The crankshaft 8 is a shaft that is rotatably supported onto a cylinder block and that is connected to the piston 9 via a con rod. The crankshaft 8 rotates by the reciprocating movement of the piston 9. The piston 9 is a member that reciprocates by airtightly sliding on the inner peripheral surface of a combustion chamber 2. The fuels supplied to the combustion chamber 2 via the injector 7 are combusted and expanded, thereby sliding the piston 9 downward (in the direction where a volume in the combustion chamber 2 is increased). The fuels are accumulated into the common rail 3 at high pressure by the driving of the supply pump, as well as the pressure in the common rail 3 is detected by the sensor and is input into the ECU 5. The ECU 5 recognizes an engine rotational speed via the pickup sensor 12 and controls the injector 7 based on maps of the engine rotation speed and the fuel injection quantity memorized in the ECU 5.

The injector 7 injects a given amount of fuels, synchronized with the rotation of the crankshaft 8, and the fuel injection quantities are adjusted by an electronic governor incorporated therein, the accelerator lever 6 or the like. The pickup sensor 12 recognizes the rotational speed of the crankshaft 8, which can recognize whether the engine 1 is on a cranking condition or on an operating condition. The coolant water temperature sensor 10 recognizes the coolant water temperature of the engine 1.

The ECU 5 is connected to the starting switch 4, the pressure sensor of the common rail 3, the pickup sensor 12, the coolant water temperature sensor 10, a rotation angle sensor of the accelerator lever 6, the clutch sensor 13 or the like. The ECU 5 can recognize the on/off operation of the starting switch 4 and the rotation speed of the crankshaft 8, as well as can control the injector 7. The starting switch 4 sets up the operating condition or the stopped condition of the engine 1, and has positions of "off (stop)". "on (operating) and "starting". When the starting switch 4 is shifted to the "starting" position, the starter is driven and the driving force is transmitted to the crankshaft 8 so as to perform the cranking operation (the engine starting). The starting switch 4 is set up to automatically reset from the "starting" position to the "on" position, and after the engine 1 is on the operating condition and the key switch is released, the starting switch 4 is retained at the "on" position, so as to maintain the operating condition of the engine 1. When the starting switch 4 is at the "on" position, the ECU 5 can recognize the coolant water temperature of the engine 1 as needed, by the coolant water temperature sensor 10. The ECU 5 recognizes the retention time at the "starting" position of the starting switch 4 and recognizes it as an energizing time of the starter.

The pickup sensor 12 as the rotation speed detecting means of the engine 1 detects the rotation speed of the crankshaft 8, i.e., the rotation speed, angular velocity or the like of the engine 1. In this regard, a magnetic pickup typed rotation speed sensor is utilized as the rotation speed detecting means in the present embodiment, but a rotation speed detecting means such as a rotary encoder may be utilized.

Next, a control flow of the engine 1 at the engine starting according to the present invention will be described. FIG. 2 is a diagram showing the control flow of the engine, and FIG. 26 is a diagram showing the conventional control flow of the engine.

When the key switch is switched on, a control circuit is evaluated whether the engine 1 is on the stopped condition or not in Step S10. When the engine 1 is not stopped, the control circuit is evaluated that the engine 1 is rotated, which is shifted to the after-mentioned Step S 40. When the engine 1 is on the stopped condition, the control circuit is evaluated that the engine 1 is in a standby mode without the rotation of the starter and is returned to the start, if the starting switch 4 is not on the "starting "position in Step S 20. When the starting switch 4 is on the "starting "position (when the start signal is switched on in the ECU 5), the coolant water temperature detection (TW0) is performed in Step S 30.

The detected water temperature (TW0) is compared with the preset temperature t0 (Step, S 31), and since, if the water temperature (TW0) is higher than the preset temperature t0, the normal starting can be performed without the white smoke or the like at the engine starting, the traveling with reduced cylinders is not performed, and the fuels are injected into all engine cylinders (cylinders) so as to start the engine. When the water temperature (TW0) is the preset temperature t0 or lower, the traveling with reduced cylinders is performed (Step, S 32).

When the engine 1 is started and on the operating condition in Step S 10, the ECU 5 evaluates whether the traveling with reduced cylinders is performed, based on the coolant water temperature (TW0). When the ECU 5 evaluates that the traveling with reduced cylinders is not performed in Step S 40, a normal control injection data map memorized in the ECU 5 is referenced (Step, S 70) so as to determine an injection data (Step, S 75). When the ECU 5 evaluates that the traveling with reduced cylinders is performed in Step S 40, an elapsed time after the starting t is compared with the predefined given time tsic in Step, S50, and if the elapsed time t is the given time tsic or less, an injection with reduced cylinders map memorized in the ECU 5 is referenced (Step, S 60) and the injection data is determined so as to start the engine (Step, S 65). If the elapsed time after the starting t is past the predefined given time tsic, the traveling with reduced cylinders is canceled (Step, S 51) and the injection data is determined by referencing the normal control injection data map (Step, S70) so as to start the engine.

In the present invention, also, the operating cylinder and the quiescent cylinder are changed every any time only at the elapsed time after the starting t as the duration time of the traveling with reduced cylinder, and alteration conditions on the cylinders are preliminarily set up in the ECU 5, on the basis of which the respective engine cylinders are controlled.

Further, in the present invention, a fuel injection quantity ratio between the operating cylinder and the quiescent cylinder are gradually changed past the elapsed time after the starting t as the duration time of the traveling with reduced cylinder, and alteration conditions on the engine cylinders are preliminarily set up in the ECU 5, on the basis of which the respective engine cylinders are controlled.

FIG. 3 is a diagram showing a generation behavior of the white smoke at the normal traveling.

In FIG. 3, the longitudinal scale shows the white smoke density, the coolant water temperature or the wall temperature in the combustion chamber. The horizontal scale shows the elapsed time after the starting of the engine 1. As shown in FIG. 3, the wall temperature in the combustion chamber rises depending on the elapsed time, while the coolant water temperature remains an approximately constant temperature for a period of time until the heat is transferred immediately after the starting, and the temperature begins to rise after a certain period of time when the wall temperature in the combustion chamber rises. Thus, in general, an equilibrium relation between the coolant water temperature and the wall temperature in the combustion chamber is not established for a few minutes right after the starting, and the wall temperature in the combustion chamber is rapidly warmed up from the temperature equivalent to the coolant water temperature before the starting, while the coolant water temperature is increased very little. Briefly, the equilibrium relation is not established for a certain time soon after the starting.

As shown in FIG. 26, in the conventional control flow of the engine, the ECU 5 evaluates whether the engine is on the starting condition or on the stopped one in Step, S100. When the engine is not on the stopped condition, the coolant water temperature is detected (Step, S 200) and the normal control injection data map memorized in the ECU 5 (the water temperature correction, Step, S300) is referenced so as to determine the injection data (Step, S 400).

Specifically, the wall temperature in the combustion chamber is estimated using the detected coolant water temperature, and if the coolant water temperature is lower than the one on the warm up condition, the white smoke can be reduced by advancing the injection timing according to the temperature (by performing the water temperature correction), while, if the equilibrium condition is not established as described above, the water temperature correction is not effective.

FIG. 4 is a diagram showing an example of controlling the traveling with reduced cylinders.

In consideration to the above problem, in the present embodiment, as shown in FIG. 2, the traveling with reduced cylinders may be performed only for a very few moments while the equilibrium condition between the wall temperature and the coolant water temperature is established soon after the engine starting, and thereafter is promptly shifted to the normal control.

Specifically, if the coolant water temperature is detected at the engine starting and the temperature is the constant value or less, the ECU 5 evaluates that the engine is on the cold starting, and the traveling with reduced cylinders is performed for the given time/given injection data, based on the coolant water temperature. When the temperature reaches the prescribed value (after the lapse of the given time τ rc, in FIG. 4), the injection with reduced cylinders is swiftly shifted to the normal one.

The situation to which the control method of the present invention is applied will be described.

FIG. 5 is a diagram showing a correlation between a temperature of coolant water before the starting and white smoke density. The longitudinal scale shows the white smoke density and the horizontal scale shows the coolant water temperature before the starting. FIG. 6 is a diagram showing the generation behavior of the white smoke during the traveling with reduces cylinders. The longitudinal scale shows the white smoke density, the coolant water temperature or the wall temperature in the combustion chamber, and the horizontal scale shows the elapsed time after the starting of the engine 1.

As shown in FIG. 5, it turns out that the white smoke level during the starting is rarely different from the white smoke density during the normal traveling at a certain coolant water temperature (the inflection-point temperature) t0 or higher, while the white smoke density is higher as the water temperature is lower at the inflection-point temperature t0 or lower. Therefore, it may be determined whether the engine is on the cold starting or not, using the inflection-point temperature of the white smoke characteristic as an index. Briefly, the preset temperature t0 of the water temperature (TW0) is used as the index.

In the control method for the internal combustion engine of the present invention, the engine rotation speed is monitored using the pickup sensor 12 at the starting, and the traveling with reduced cylinders is started at the time when the ECU 5 evaluated that the engine rotation speed reaches 50 to 100% of the idle-speed. It is ideal that the traveling with reduced cylinders is started at the on operation of the ignition in view of reducing the white smoke, but this results in requiring more time for the starting. The black smokes are discharged when the fuel injection quantity is increased so as to hasten the starting. Therefore, the injections using all engine cylinders are performed at the beginning of the starting, and it is shifted to the traveling with reduced cylinders at the time when the engine rotation speed reaches the given rotation speed (more than 50% of the idle-speed) so as to continue for a certain period of time. This results in the increase of the fuel injection quantity per one cylinder engine, so as to raise the combustion temperature, thereby promptly warming up the walls in the combustion chamber and lowering the white smoke, as an original effect of the traveling with reduced cylinders (see FIG. 6).

The above-mentioned certain period of time means a time until the wall temperature in the combustion chamber of the quiescent cylinder engine is adequately warmed up to the level without the generation of the white smoke.

Thus, when it is evaluated that the engine 1 is on the cold starting, the traveling with reduced cylinders, which reduces the number of cylinders performing fuel injections for a certain period of time, is performed after the engine rotation speed reaches the given number after the engine starting, thereby increasing the injection quantity per one cylinder (increasing the equivalence ratio) and improving the combustion due to the increase of the combustion temperature, so as to prevent the white smoke at the starting and soon after the starting.

A timing shifting from the traveling with reduced cylinders to the normal traveling (the traveling with all cylinders in operation) will be described.

As shown in FIG. 2, when the traveling with reduced cylinders is switched on, the traveling with reduced cylinders map memorized in the ECU 5 is referenced (Step, S 60). For example, the after-mentioned traveling with reduced cylinders duration time map, the traveling with reduced cylinders downstream temperature map or the like are incorporated into the traveling with reduced cylinders map, as standards of the timing switching from the traveling with reduced cylinders to the normal traveling, and the traveling with reduced cylinders is performed for a period of time based on the maps.

[Preparation of the Traveling with Reduced Cylinders Duration Time Map]

The coolant water temperatures (TW0) when the starting switch 4 (the starter) of the engine 1 is turned on are taken as samples using the coolant water temperature sensor 10, and the traveling with reduced cylinders duration time needed when starting at the water temperature is calculated. This is calculated using a table at which the coolant water temperatures (TW0) is on the X-axis and the traveling with reduced cylinders duration time ($\tau$ rc) is on the Y-axis or the like.

[Preparation of the Traveling with Reduced Cylinders Downstream Temperature Map]

The coolant water temperatures (TW0) when the starting switch 4 (the starter) of the engine 1 is turned on are taken as samples using the coolant water temperature sensor 10, and the traveling with reduced cylinders target water temperature increased amount needed when starting at the water temperature is calculated. This is calculated using a table at which the coolant water temperatures (TW0) is on the X-axis and the target water temperature (TWt) is on the Y-axis or the like.

Alternatively, the value that adds $\Delta$ TW equally to the coolant water temperatures (TW0) at the starting may be defined as the target water temperature TWt. It is preferable that the $\Delta$ TW in this case may be a value within 20 degrees C.

In this regard, it is possible that the coolant water temperature would be understated even if the engine 1 is on the semi-warming up condition, depending on the installation positions for a thermostat, the temperature sensors or the operating condition before the stopping. In this case, since the water temperature is promptly increased after the starting, the engine 1 is set up to be shifted to the normal control when the water temperature is beyond the constant value.

Considering the above any condition, the target coolant water temperature is set up to terminate the traveling with reduced cylinders and the traveling with reduced cylinders downstream temperature map is prepared.

As seen from the above, the traveling with reduced cylinders is performed for a certain period of time, by setting up the traveling with reduced cylinders duration time depending on the coolant water temperature at the engine starting, based on the traveling with reduced cylinders duration time map, using the traveling with reduced cylinders duration time map, which sets up the duration time of the traveling with reduced cylinders in accordance with the coolant water temperature at the engine starting, so that the certain period of time can be set up as a more adequate value using the map, so as to effectively prevent the white smoke.

The traveling with reduced cylinders is performed, until the coolant water temperature reaches the temperature preliminarily set up in the traveling with reduced cylinders downstream temperature map, using the traveling with reduced cylinders downstream temperature map, which sets up the traveling with reduced cylinders downstream temperature corresponding to the coolant water temperature of the engine 1, so that the generation of the white smoke can be retrained, by the minimum traveling with reduced cylinders.

The construction of the fuel injection at the traveling with reduced cylinders will be described, with reference to FIGS. 7, 8 and 9.

FIG. 7 is a diagram showing temporal change of the temperature in the combustion chamber. FIG. 7 (a) is the case of the single stage injection, and FIG. 7 (b) is the case of the multistage injection. FIG. 8 is a diagram showing a correlation between a reaching distance of fuels and time while injecting the fuels by the single stage injection. FIG. 9 is a diagram showing a correlation between a reaching distance of fuels and time while injecting the fuels by the multistage injection. The longitudinal scales in FIGS. 8 and 9 show a reaching distance of injections, and the horizontal scales $\tau$ id thereof show the time needed when the fuels are compressed and ignited in the combustion chamber 2 (hereinafter, referred to as "the ignition lag time").

In FIG. 8, the fuels reach the wall surface before reaching the ignition time in the case of the single stage injection. When the temperature of the engine 1 is high, the fuels attached to the wall surface are easy to be evaporated so as to be combusted, while they are difficult to be evaporated due to the lowness of the wall temperature when the traveling with reduced cylinders is preformed at the engine starting.

Specifically, if a large amount of fuels equivalent to twice the normal traveling are injected from the injector 7 into the combustion chamber 2 at one time when the compression end temperature/pressure is extremely low (by traveling with reduces cylinders), for example in the immediate aftermath of the cold start, the fuels attached to the wall surface are increased, so that the inner pressure/temperature in the cylinders could be drastically lowered and the accident fire could be caused due to the evaporative latent heat. Meanwhile, in the construction that the highly-pressure fuels are supplied from the common rail 3 to the injector 7, the multistage injection can be performed, as well as in this case, it is an effective method that a small amount of fuels are injected before the main fuel injection and the main fuels are injected so as to be assuredly ignited when they are on the combustible condition (see FIG. 7). As the time per one injection becomes longer, fuel quantities collided with the wall surface of the combustion chamber are increased and so, it is desirable to divide the pre-injection before the main injection into low amount and multistage injection wherever possible (two-stage injection in the present embodiment) so as to reduce the white smoke (see FIG. 9).

In other words, since the injection force per one injection is reduced by the multistage injection, the fuels are difficult to reach the wall surface.

Thus, as the traveling with reduced cylinders is always comprised of at least two-stage or more fuel injections, the fuels can be prevented from attaching to the wall surface of the combustion chamber when injecting the fuels, and the generation of the white smoke can be reduced by steadily igniting the injected fuels on the low wall temperature condition. At the same time, the ignition lag can be shortened by the multistage injection, thereby being capable of decreasing the combustion noise FIG. 10 is a diagram showing examples of maps of injection with reduced cylinders.

In order to further enhance the effects of the traveling with reduced cylinders in the present invention, the fuel injection pattern at the normal traveling and the injection pattern at the traveling with reduced cylinders are independently comprised. Specifically, maps such as the injection timing, the injection pressure and pre-injection, which are different from the normal traveling, are referenced during the mode of traveling with reduced cylinders. It is desirable that the injection patterns are set up relative to the coolant water temperature in the maps as examples in FIG. 10, so as to aim at the reduction of the white smoke especially soon after the starting. In this regard, as a basic concept, it is effective to increase the pre-injection quantity before the main injection as the water temperature is lower and to space between the injections so as to restrain the white smoke, but since other factors such as the combustion noise need to be considered, the detailed values should be calculated using a conformance test.

As seen from the above, the optimal injection patterns during the traveling with reduced cylinders can be selected, using the injection maps for the traveling with reduced cylinders exclusive use, which are different from the normal traveling during the traveling with reduced cylinders.

FIG. 11 is a diagram showing the correlation between the injection timing and the noise/white smoke. The longitudinal scale shows the combustion noise and the white smoke density, and the horizontal scale shows the main injection timing.

The traveling with reduced cylinders has larger injection quantities than the normal control (the injection with all engine cylinders), leading to the increase in the combustion noise. In general, since there is a relationship shown in FIG. 11 between the combustion noise and the white smoke discharge tendency, it is possible to set up the main injection timing at the timing equivalent to the normal control or more retarded timing so as to restrain the white smoke evacuation and take the noise control measure.

In this way, the noise can be lowered by delaying the main fuel injection starting timing in the traveling with reduced cylinders mode of the engine 1, relative to the timing in the normal traveling mode.

The engine load burdened at the traveling with reduced cylinders could cause the troubles such as the damage of the crank. Therefore, the control that swiftly shifts from the traveling with reduced cylinders mode to the normal traveling mode at preliminary step toward the load traveling, i.e., the control so as to prematurely close the traveling with reduces cylinders is performed. As a method for detect the load, the methods for detect, for example, the main clutch detecting position, or the operation lever operative position are considered, but additionally, the methods for detecting the lack position of the electronic governor and detecting the load using the required detected value of the injection quantity are effective.

Thus, when the engine 1 is shifted to the condition equivalent to the load traveling, the traveling with reduced cylinders mode is promptly returned to the normal control mode, so that the regular engine specifications can be exerted, by shifting from the traveling with reduced cylinders to the normal traveling, as soon as the cause of the white smoke is dissolved.

When the engine rotation speed is enhanced, the traveling with reduced cylinders is set up to be promptly returned to the normal control. As a means for detecting the acceleration of the engine, the engine rotation speed, the acceleration opening degree or the like are available. For example, as shown in FIG. 1, when the engine rotation speed is detected using the pickup sensor 12 and it is beyond the given engine rotation speed, or when the acceleration opening degree is detected and it is beyond the predefined acceleration degree, the traveling with reduced cylinders is returned to the normal control, respectively.

Thus, as soon as the engine 1 is accelerated over the prescribed rotation speed, the traveling with reduced cylinders mode of the engine 1 is promptly returned to the normal control mode, so that the regular engine specifications can be exerted, by swiftly shifting from the traveling with reduced cylinders to the normal traveling.

FIG. 12 is a diagram showing the reintroduction of the traveling with reduced cylinders by detecting the accident fire. The longitudinal scale shows the white smoke density and a required injection quantity (QFIN), as well as the horizontal scale shows the elapsed time after the starting.

In the present invention, the traveling with reduced cylinders duration time when using a low-cetane fuel need to be set up longer than the time when using a normal high-cetane fuel. This is because the accident fire is generated when the traveling with reduced cylinders is shifted to the normal control, unless the water temperature or the wall temperature of the combustion chamber is more increased. In preparation for this case, when the ECU 5 evaluates that a part of the engine cylinders have the accident fire right after shifting to the normal control (soon after the traveling with reduced cylinders is turned off), i.e., the required injection quantity (QFIN) is unstable within the given time (the hunting is caused due to the accident fire), the normal control need to be swiftly shifted to the traveling with reduced cylinders (the traveling with reduced cylinders is turned on), so as to reduce the white smoke density. In other words, the accident fire in the combustion chamber can be detected by monitoring the required injection quantity (QFIN) by the ECU 5.

As seen from the above, when the ECU 5 evaluates that the accident fire or the delayed combustion remains generated at the termination of the traveling with reduced cylinders, using the accident fire detecting means detecting the accident fire of the engine 1 in the combustion chamber 2, the traveling with reduced cylinders is continued for a certain period of time, whereby the increases in the hunting and the white smoke during the control transfer due to the fuel property can be restrained, and the traveling with reduced cylinders can be canceled after the engine 1 has been warmed up to the level enough to endure the injections by all engine cylinders.

In this respect, as the present invention, the required injection quantity (QFIN), the engine rotation speed (the angular velocity/the angular acceleration) or the like in the ECU 5 are considered as the accident fire detecting means for the engine 1, but THC, CO in the exhaust gas, exhaust gas temperature or the like can be utilized.

FIG. 13 is a diagram showing the embodiment in case of operating only 1, 2 and 3 groups (the engine cylinders No 1, No 2 and No 3) out of six-cylinder engine.

In the six-cylinder engine shown in the embodiment of FIG. 13 (*a*), cylinders are arranged in line, and an intake manifold is provided on one side of the longitudinal direction thereof with an intake port 15, which is provided with an air heater 16. In the six-cylinder engine shown in the embodiment of FIG. 13 (*b*), cylinders are disposed in line, an intake manifold is provided at the middle in the longitudinal direction thereof with an intake port 17, which is provided with a partition plate 19 so as to separate right from left and is provided on the intake side in the lateral direction thereof with an air heater 18.

The air heater or a glow heater as intake air heating system is utilized, aimed at raising the intake air temperature at the cold start so as to increase the intake air temperature of the compression end and enhance the evaporation/ignition of the fuels. The above-mentioned effects can be advanced, by selectively performing the above-described temperature increasing means for the engine cylinders ignited and operated soon after the cold start that the white smoke is extremely deteriorated, when the traveling with reduced cylinders is adopted. As a specific implementation method, for example, when the traveling with reduced cylinders only on one bank is performed in the V-typed engine, it is conceivable that an air heater (an intake air heating unit), disposed between the air cleaner on the bank of the side that the traveling with reduced cylinders is performed (of the side of injecting the fuels) and a liaison portion to the intake manifold, is operated.

Because the intake manifolds and cylinder heads of six engine cylinders are integrally installed in the in-line six-cylinder engine, for example, as shown in FIG. 13 (*a*), the traveling with reduced cylinders is performed only on 1, 2 and 3 groups (the engine cylinders No 1, No 2 and No 3) at the near side of the intake port, and the 1, 2 and 3 groups of engine cylinders are connected near the liaison portion from the air cleaner, which is provided with the air heater 16 (the intake air heating unit), thereby warming up the intake air and selectively increasing the temperature of it (a relatively-warm air A1 as shown by an arrow in FIG. 13 (*a*)). As shown in FIG. 13 (*b*), the intake manifold disposed between the 1, 2 and 3 groups as well as the 4, 5 and 6 groups (the engine cylinders No 4, No 5 and No 6) is provided with the partition plate, at the slipstream side of which is provided with the air heater 18, thereby being capable of warming up the intake air on one side thereof, so as to enhance the startability and reduce the white smokes. These effects can be realized even other than those above if the intake air heating system works only on the operating cylinders. The above-mentioned objects can be achieved by energizing only the engine cylinders performing the traveling with reduced cylinders at the starting, because the glow heaters are directly inserted into the cylinders in case of the internal combustion engine with the glow heater.

The foregoing methods are suitable for the case where the traveling with reduced cylinders is performed only on one bank especially in the V-typed engine or the traveling with reduced cylinders is performed only on the particular cylinders in in-line cylinder engine. In this case, the combusting engine cylinders are selected so that the rotation of the crankshaft 8 is not unbalanced. For example, the engine cylinders (the cylinders), which combust every equal angle at the rotation of the crankshaft 8 and is in as close contact as possible with each other, are selected.

As described above, in the intake air heating units, which heat the intake air introduced into the combustion chamber 2 of the engine 1, the intake air heating units on the sides of the engine cylinders performing the traveling with reduced cylinders at the cold starting are turned on, and the intake air heating units are turned off when the water temperature is the predefined temperature or higher (alternatively, after the termination of the traveling with reduced cylinders, or after a certain time of the engine starting), thereby being capable of acquiring the constant and highly effective power consumption. Incidentally, when heating the intake air even after the traveling with reduced cylinders at low temperature, the glow heaters in all engine cylinders may be heated.

FIG. 14 is a diagram of configuration examples of an intake throttle valve/exhaust throttle valve.

As shown in FIG. 14, the engine has a supercharger 20 which compresses the intake air and supplies it. The intake air discharged from the supercharger 20 is sent via an intake throttle valve 21 to the intake manifold 23 and it is supplied via the intake manifold 23 to the respective engine cylinders of six cylinders provided with a cylinder head H. The exhaust air after the combustion is discharged via an exhaust manifold 24 installed to the cylinders, which is discharged via the supercharger 20 and an exhaust pipe. The exhaust pipe has an exhaust throttle valve 22.

Due to the above construction, the intake throttle valve 21 is installed aimed at increasing the equivalence ratio of the gases in the cylinders by reducing the intake air quantity especially on a low idling condition so as to increase the combustion temperature accordingly. The exhaust throttle valve 22 reintroduces parts of the once-discharged high-temperature burned gas in the cylinders by increasing a back pressure so as to increase the equivalence ratio and preheats the gas in the cylinders. Because both of them lead to pumping losses, they have effects of increasing the injection quantity per cycle.

These means are effective in case of the normal combustion, but they are inadequate as the equivalence ratio is excessive and the black smokes are generated in combination with the traveling with reduced cylinders (see FIG. 15). Therefore, these functions should be canceled at the traveling with reduced cylinders.

As described above, throttle mechanisms, comprising of the intake throttle valve 21 controlling the intake volume to the engine 1 or the exhaust throttle valve 22 controlling the exhaust volume, are provided, as well as they are not operated at the traveling with reduced cylinders and operative after the traveling with reduced cylinders, thereby restraining the generation of the black smoke.

FIG. 16 is a diagram showing the combustion noise during the traveling with reduced cylinders. An adverse effect (the decreased reliability) accompanying the biased temperature between the engine cylinders becomes pronounced when traveling with reduced cylinders for a long time. As shown in FIG. 4, since the traveling with reduced cylinders only for a few minutes to ten or more minutes is performed so as to reduce the white smoke at the cold starting, the white smokes are not deteriorated even when the traveling with reduced cylinders is shifted to the normal traveling from then on. However, as shown in FIG. 16, as the traveling with reduced cylinders has more combustion noises and vibrations than the normal traveling, it is not desirable to continue the traveling with reduced cylinders for a long time.

Meanwhile, because when the time during the traveling with reduced cylinders is short, the wall temperatures in the combustion chambers on the sides of the quiescent cylinders does not fully rise, the white smokes are generated after the normal traveling with reduced cylinders has been shifted to the normal traveling. In order to avoid this situation, the operating engine cylinders and the quiescent cylinder ones need to be alternately changed every setting time, or they need to be switched over in order even constant cycle, so as to evenly increase the wall temperatures in the combustion chambers. In this regard, as the present invention, the operating cylinders and the quiescent cylinders are alternately changed only at the traveling with reduces cylinders so as to restrain the discharge of the white smoke.

Because, when the time during the traveling with reduced cylinders is too short, the wall temperature in the combustion chamber on the side of the quiescent engine cylinders does not fully rise, the white smokes are generated after shifting from the traveling with reduced cylinders to the normal traveling. Therefore, it is preferable to restrict the time during the traveling with reduce cylinders to a certain period of time after the starting.

In order to further avoid the generation of the white smoke when shifting from the traveling with reduced cylinders to the normal traveling, means for warming up the quiescent engine cylinders need to be taken during shifting from the traveling with reduced cylinders to the normal traveling, so as to equally increase the wall temperature in the combustion chamber. In this regard, as the present invention, the discharge of the white smoke is further restrained, by controlling the fuel injection quantity ratio between the operating and the quiescent engine cylinders and by gradually warming up the quiescent cylinders, even after the traveling with reduced cylinders for a certain period of time.

Incidentally, the numbers of the operating and the quiescent cylinders need not to be necessarily equal, and are arbitrarily settable depending on the construction of the engine 1. However, because, when a combination of inappropriate cylinder groups are selected, an abnormal vibration of the engine 1 is caused along with the torque fluctuations, the cylinder groups need to be selected in consideration of the rotation balance.

Thus, in the method for controlling the electronically-controlled direct fuel injection engine 1 performing the traveling with reduced cylinders at the cold starting, the duration of traveling with reduced cylinders is limited to a certain period of time after the starting, and the operating cylinders and the quiescent cylinders are changed every setting time within the duration of traveling with reduced cylinders, thereby restraining the white smoke at the starting and soon after the starting and inhibiting the increasing of the white smoke when shifting from the traveling with reduced cylinders to the normal traveling.

FIG. 17 is a diagram showing the switching control in case of the in-line six cylinder engine.

In case of the in-line (L-typed) six cylinder engine of the present embodiment, as shown in FIG. 17 (*a*), engine cylinders Nos. 1 to 6 are arranged in line, and the ignition order in the engine cylinders Nos. 1 to 6 is 1-4-2-6-3-5-1, as well as the 1, 2, 3 cylinder groups and the 4, 5, 6 cylinder groups are alternately ignited every 120 degree CA, so that fluctuation unbalance is less well increased even when the cylinder groups on one side are halted. Therefore, as shown in FIG. 17 (*b*), the most simple implementation method is to shift the operations between the 1, 2, 3 cylinder groups and the 4, 5, 6 cylinder groups at the predesignated time t1 when the traveling with reduced cylinders is turned on.

In this regard, the switching time t1 is a value that is empirically calculated using the water temperature, the intake temperature or the like at the starting.

As described above, in the method for controlling the internal combustion engine with the L-typed six cylinders, the 1, 2, 3 cylinder groups and the 4, 5, 6 cylinder groups are alternately halted every certain period of time within the duration of the traveling with reduced cylinders, thereby being capable of restraining the combustion noise without the large fluctuation unbalance in the engine 1.

FIG. 18 is a diagram showing the switching control in case of V-typed eight cylinder engine.

As shown in FIG. 18 (*a*), the V-typed eight cylinder engine of the present embodiment is formed so that the engine cylinders form V bank and it is comprised of two banks of a A bank 25 on one side and a B bank 26 on the other side. Four engine cylinders are disposed in the respective banks of the A bank 25 and the B bank 26. As is case with the in-line six cylinder engine in the V-typed eight cylinder engine, as shown in FIG. 18 (*b*), the operations between the engine cylinders of the A bank 25 and the B bank 26 are alternately shifted at the predesignated time t1 when performing the traveling with reduced cylinders. In this case, the large fluctuation unbalance is not caused in the engine 1, by setting up the quiescent cylinders every one bank in accordance with the lay out of the crankshaft 8.

Incidentally, as an example of the V-typed multicylinder engine in the present embodiment, the V-typed eight cylinder engine is represented, but the V-typed multicylinder engine is not limited to it.

Thus, in the method for controlling the internal combustion engine with the V-typed multicylinders equipped with two banks, the cylinders on one bank and those on the other bank are alternately halted every certain period of time within the duration of the traveling with reduced cylinders, thereby restraining the combustion noise without the large fluctuation unbalance in the engine 1.

In this respect, the above-mentioned in-line six cylinder engine is divided into the 1, 2, 3 cylinder groups and the 4, 5, 6 cylinder groups, and the V-typed eight cylinder engine is divided into the engine cylinders of the A bank and the B bank, so that the respective engine cylinders are divided so as to form unified groups, but the respective engine cylinders may be controlled so that they are independently divided into the operating cylinders and the quiescent ones by precisely calculating them so as to restrain the fluctuation unbalance when possible.

FIG. 19 is a diagram showing the overlap control when shifting the operating cylinders.

When the operating cylinders and the quiescent ones are switched every certain period of time when performing the traveling with reduced cylinders, the quiescent cylinders have accident fires, leading to the generation of the engine stall. In order to prevent this, both of the A and B banks are operated for a few moments at the switching timing (the overlap control).

Specifically, in FIG. 19, as soon as the traveling with reduced cylinders is turned on, the A groups (the above-mentioned 1, 2, 3 cylinder groups or the cylinders in the A bank 25) start operating, while the B groups (the above-mentioned 4, 5, 6 cylinder groups or the cylinders in the B bank 26) are in a quiescent mode of operation, during the passage of time t1. The cylinders in the B groups are started at sometime early time before the time t1, so that both of the cylinder groups in the A and B groups are in the operating condition for a few moments. Then, the cylinders in the A groups are in the quiescent mode of operation just at the time t1. Thus, the operating conditions of the A and B groups are provided with slightly overlapped portions (normal injection portions).

In this regard, since the white smokes are generated during the overlap control, it is desirable to perform the control only for as brief a period as possible.

As seen from the above, the predetermined overlap time is provided when the engine cylinders are alternately halted every certain period of time, thereby preventing the generation of the engine stall.

FIG. 20 is a diagram of an embodiment when traveling by switching the 1, 2, 3 cylinder groups (the engine cylinders No. 1, No. 2 and No. 3) to the 4, 5, 6 cylinder groups (the engine cylinders No. 4, No. 5 and No. 6) in the in-line six cylinder engine, and FIG. 21 is a diagram of an operation example of the air heater in the in-line six cylinder engine.

In the six-cylinder engine shown in the embodiment of FIG. 20, cylinders are disposed in line, an intake manifold is provided at the central portion in the longitudinal direction thereof with an intake port 27, which is provided with a partition plate 28 so as to separate right from left, as well as is provided on the side of the 1, 2, 3 cylinder groups (the engine cylinders No. 1, No. 2 and No. 3) with an air heater A and on the side of the 4, 5, 6 cylinder groups (the engine cylinders No. 4, No. 5 and No. 6) with an air heater B.

The air heater or the glow heater as the intake air heating system is utilized, aimed at raising the intake air temperature at the cold start so as to increase the intake air temperature of the compression end and enhance the evaporation/ignition of the fuels. The above-mentioned effects can be advanced, by selectively performing the above-described temperature increasing means for the engine cylinders ignited and operated soon after the cold start that the white smokes are extremely deteriorated, when the traveling with reduced cylinders is adopted. As a specific implementation method, for example, in the V-typed engine, the air heaters are disposed between a supercharger or an intercooler on one bank and a liaison portion from the air cleaner on the bank of the side that the traveling with reduced cylinders is performed (of the side of injecting the fuels) to the intake manifold, and only the air heaters on the side of the operating cylinders are operative. When switching to the operation in the opposite bank after the elapse of a certain period of time, the air heaters are also switched at the same time.

It's often the case that the intake manifold and the cylinder head are integrally installed with six-cylinders in the in-line six cylinder engine, but, for example, as shown in FIG. 20, the intake manifold between the 1, 2, 3 cylinder groups and the 4, 5, 6 cylinder groups is provided with a partition plate 28, at the slipstream side of which is provided with the air heaters A and B, thereby performing the on/off control every operating cylinders and warming up the intake air on one side thereof, so as to enhance the startability and reduce the white smoke.

Specifically, as shown in FIG. 21, briefly, only the air heater on the side of the operating cylinders are operative. When the 1, 2, 3 cylinder groups are the operating cylinders, the air heater A is switched on and the air heater B is switched off, while the air heater A is switched off and the air heater B is switched on when the 4, 5, 6 cylinder groups are the operating cylinders.

In this regard, the structures other than the above-mentioned examples are feasible as far as they work the intake air heating system for only the operating cylinders.

Because internal combustion engine using the glow heater is directly inserted into the cylinders, the above-mentioned objects can be achieved by energizing only cylinders traveling with reduced cylinders at the starting.

Since the switching of the air heater or the glow heater requires more time for increasing the temperature in the heater itself, it is sometimes useful to be energized ahead of switching the operating cylinders.

The above-described methods are the ones suitable when traveling with reduced cylinders by only one bank especially in the V-typed engine or when traveling with reduced cylinders only by specific cylinders in the in-line engine. In this case, the combusted cylinders are selected so that the rotation of the crankshaft 8 is not unbalanced. For example, the engine cylinders (the cylinders) as close as possible are selected, by combusting them every equal angle at the rotation of the crankshaft 8.

Thus, the intake air heating system for heating the intake air introduced into the combustion chamber 2 in the engine 1 is disposed, and the intake air heating system on the side of the engine cylinders performing the traveling with reduced cylinders at the cold starting is switched on, as well as the intake air heating system are halted when the water temperature is the preset temperature or more (alternatively, after the traveling with reduced cylinders or after a certain period of time of the engine starting), so that the higher effect can be achieved remaining constant in the power consumption. Incidentally, when the intake air is heated even after the traveling with reduced cylinders at low temperature, the glow heaters in all engine cylinders are heated.

FIG. 22 is a diagram showing a relationship between the fuel injection quantity per cylinder engine and the combustion noise. The longitudinal scale shows the combustion noise and the horizontal scale shows the fuel injection quantity per cylinder engine.

As mentioned above, the operation is returned to the normal traveling after the predetermined time of the traveling with reduced cylinders, and at this time, the fuels are injected by all engine cylinders, during the predetermined time, so as to prevent the white smoke from generating on the side of the quiescent cylinders. In this regard, the ratio of the fuel injection quantity is set up to be different between the sides of the operating cylinders and the quiescent cylinders (the operation so as to prevent the white smoke during the predetermined time after the traveling with reduced cylinders is defined as the semi-traveling with reduced cylinders).

The cylinder groups having a larger amount of injections can continuously reduce the white smoke through the same influence as the traveling with reduced cylinders, by performing the above-mentioned operation. Meanwhile, the cylinder groups having a smaller amount of injections have a possibility of causing the accident fire due to a part of the fuels, but as they totally have a smaller amount of injections, they do not cause the remarkably increase in the white smoke. The wall temperature in the combustion chamber is warmed up to a certain degree, at the end of the traveling with reduces cylinders, thereby infinitely lowering the risk of the accident fire in comparison to the case without the traveling with reduced cylinders.

Because the combustion is performed even in the quiescent cylinder groups having a relative lower wall temperature in the combustion chamber, the white smokes are not readily generated when switching to the normal traveling.

Moreover, another object to perform the above-mentioned operation is to reduce the combustion noise or the fluctuation, so as to lower the fuel injection quantity per one cylinder engine compared to the traveling with reduced cylinders (see FIG. 22).

The time for continuing the aforementioned operation is determined by maps or the like made based on, for example, the coolant water temperature (TW0), the intake temperature, the room temperature or the like.

As seen from the above, in the method for controlling the electronically-controlled direct fuel injection internal combustion engine performing the traveling with reduced cylinders at the cold starting, the period for the traveling with reduced cylinders is limited to the certain period of time after the starting, and after the elapse of the certain period of time, the ratios of the fuel injection quantity between the operating and quiescent engine-cylinders are varied by the predetermined rate, by slow degrees (proportionally or inversely), or by easy stages, thereby restraining the white smoke at the starting and soon after the starting as well as inhibiting the increase in the white smoke when switching from the traveling with reduced cylinders to the normal traveling. The combustion noise or the fluctuation can be reduced accordingly.

FIG. 23 is a diagram showing an example (A) of switching control from the traveling with reduced cylinders to the normal traveling.

As shown in FIG. 23, the traveling with reduced cylinders is performed during a certain period of time, and a small amount of fuels are injected on the side of the quiescent engine cylinders for t2 seconds after the traveling with reduced cylinders (QB). On this occasion, as the overall supplied heat quantities are increased, the fuel injection quantity on the side of the operating cylinders (QA) is decreased. In other words, the traveling is continued under the condition; the injection quantity on the operating side: the injection quantity on the quiescent side=X:Y (X>Y) as the ratio of the fuel injection quantity (the injection quantity on the operating side: the injection quantity on the quiescent side=QA:QB, QA>QB, in FIG. 23). When the example of switching control (A) is performed, the quiescent engine cylinders can be moderately heated. Incidentally, in this case, the ratio of both injection quantities is set up to be larger without increasing the white smoke from the cylinder groups having a smaller amount of injections.

Accordingly, the white smoke is not readily generated, when shifting from the traveling with reduces cylinders to the normal traveling, by injecting a small amount of fuels on the side of the quiescent engine cylinders after the lapse of the aforementioned certain period of time.

FIG. 24 is a diagram showing an example (B) of switching control from the traveling with reduced cylinders to the normal traveling.

The example (B) of control shown in FIG. 24 is a control method that the traveling with reduced cylinders is performed during a certain period of time, and that, for t2 seconds after the traveling with reduced cylinders, the injection quantity (QB) on the side of the quiescent engine cylinders is increased so as to rapidly increase the wall temperature in the combustion chamber, contrary to the example (A) of switching control as shown in FIG. 23. In other words, the traveling is continued under the condition; the injection quantity on the operating side: the injection quantity on the quiescent side=X:Y (X<Y) (the injection quantity on the operating side: the injection quantity on the quiescent side=QA:QB, QA<QB, in FIG. 24). When the example of switching control (B) is performed, the quiescent engine cylinders can be swiftly heated.

Accordingly, the wall temperature in the combustion chamber is rapidly increased, by reversing the ratio of the fuel injection quantities in the quiescent and operating engine cylinders after the lapse of the aforementioned certain period of time, thereby promptly returning to the normal traveling.

FIG. 25 is a diagram showing an example (C) of switching control from the traveling with reduced cylinders to the normal traveling.

The example (C) of control shown in FIG. 25 is a control method that the traveling with reduced cylinders is performed during a certain period of time, and that, for t2 seconds after the traveling with reduced cylinders, the injection quantity on the quiescent side is gradually increased from zero while the injection quantity on the operating side is gradually decreased, so that the ratio of both injection quantities becomes 1:1 at the lapse of t2 seconds after the traveling with reduced cylinders by gradually changing the ratio of both injection quantities.

Accordingly, the ratio of the fuel injection quantities in the quiescent and operating engine cylinders after the lapse of the aforementioned certain period of time is gradually changed, and finally it is equivalent to the quantity in the normal traveling, so that the white smoke is not readily generated when shifting from the traveling with reduces cylinders to the normal traveling.

The engine load burdened when the engine 1 is at the semi-traveling with reduced cylinders mode could cause the troubles such as the damage of the crank. Therefore, the control that swiftly shifts from the semi-traveling with reduced cylinders mode to the normal traveling mode at preliminary step toward the load traveling, i.e., the control so as to prematurely close the semi-traveling with reduced cylinders, is performed. As a method for detecting the load, the main clutch detecting position, or the operation lever operative position are considered, but additionally, the methods for detecting the lack position of the electronic governor and for detecting the load using the required detected value of the injection quantity are effective.

The operation is set up to return to the normal control even when the engine rotation speed is increased. As a means for detecting the increase in speed of the engine, the engine rotation speed, the acceleration opening degree or the like are effective. For example, as shown in FIG. 1, when the engine rotation speed is detected by the pickup sensor 12 and it is beyond the predefined engine rotation speed, as well as when the acceleration opening degree is detected and it is beyond the given acceleration quantity, the operation is set up to return to the normal control, respectively.

As seen from the above, when the internal combustion engine is evaluated that it is on the load operation mode or increases in speed at the semi-traveling with reduced cylinders mode of the engine 1, it is swiftly returned to the normal traveling mode, thereby preventing the troubles due to the engine load or the like. The regular engine specifications can be exerted by promptly switching from the traveling with reduced cylinders to the normal traveling.

INDUSTRIAL APPLICABILITY

The method for controlling the internal combustion engine according to the present invention is widely applicable to the automobiles, the ships, the industrial machinery equipped with the internal combustion engine or the like.

The invention claimed is:

1. A method for controlling an internal combustion engine comprising:
   a coolant water temperature detecting means for detecting the coolant water temperature of the internal combustion engine,
   a rotation speed detecting means detecting the rotation speed of the internal combustion engine, and
   a control means controlling an operation of the internal combustion engine in accordance with the coolant water temperature and the rotation speed,
   wherein a traveling with reduced cylinders, which reduces the number of engine cylinders injecting fuel for a certain period of time, is performed when the control means evaluates that the internal combustion engine is in a cold start state and that the rotation speed has reached a predetermined rotation speed after the engine starting,
   wherein injection maps for the traveling with reduced cylinders, which are different from a normal traveling map, are memorized in the control means and the injection maps are referenced by the control means during the traveling with reduced cylinders,
   wherein the traveling with reduced cylinders is performed until the coolant water temperature reaches a temperature preliminarily set up in a traveling with reduced cylinders downstream temperature map, which sets up the traveling with reduced cylinders downstream temperature corresponding to the coolant water temperature of the internal combustion engine at the starting,
   wherein the traveling with reduced cylinders mode comprises at least two-stage or more multistage fuel injections into the operating cylinders, and
   wherein the traveling with reduced cylinders mode of the internal combustion engine delays the main fuel injection starting timing relative to the timing in a normal traveling mode.

2. The method for controlling the internal combustion engine as set forth in claim 1, wherein when the internal combustion engine is shifted to the condition equivalent to load traveling, the traveling with reduced cylinders mode promptly returns to the normal control mode.

3. The method for controlling the internal combustion engine as set forth in claim 1, wherein the traveling with reduced cylinders mode of the internal combustion engine swiftly returns to the normal control mode when the internal combustion engine works at or above a prescribed rotation speed.

4. The method for controlling the internal combustion engine as set forth in claim 1, wherein:
   a misfire detecting means detects a misfire of the internal combustion engine in a combustion chamber, and
   when the control means has evaluated that the misfire remains generated at the termination of the traveling with reduced cylinders, the traveling with reduced cylinders is continued for a certain period of time.

5. The method for controlling the internal combustion engine as set forth in claim 1, wherein:
   an intake air heating system which heats an intake air introduced into the combustion chamber of the internal combustion engine is provided, and
   the intake air heating system works on the operating cylinders during the traveling with reduced cylinders.

6. The method for controlling the internal combustion engine as set forth in claim 1, wherein:
   a throttle mechanism, consisting of an intake throttle valve for controlling the intake volume to the internal combustion engine or an exhaust throttle valve for controlling the exhaust volume is provided, and
   the throttle mechanism is not operated during the traveling with reduced cylinders and is operated after the traveling with reduced cylinders.

* * * * *